United States Patent
Kimata

(10) Patent No.: US 9,661,632 B2
(45) Date of Patent: May 23, 2017

(54) WIRELESS TRANSMISSION DEVICE, POWER CONTROL METHOD AND PROGRAM

(75) Inventor: Yusuke Kimata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 571 days.

(21) Appl. No.: 14/005,097

(22) PCT Filed: Jan. 13, 2012

(86) PCT No.: PCT/JP2012/050600
§ 371 (c)(1),
(2), (4) Date: Sep. 13, 2013

(87) PCT Pub. No.: WO2012/124361
PCT Pub. Date: Sep. 20, 2012

(65) Prior Publication Data
US 2014/0011530 A1    Jan. 9, 2014

(30) Foreign Application Priority Data
Mar. 16, 2011   (JP) .................. 2011-057620

(51) Int. Cl.
*H04B 7/00* (2006.01)
*H04W 72/04* (2009.01)
(Continued)

(52) U.S. Cl.
CPC .......... *H04W 72/0473* (2013.01); *H04B 1/04* (2013.01); *H04W 52/226* (2013.01);
(Continued)

(58) Field of Classification Search
None
See application file for complete search history.

(56) References Cited

U.S. PATENT DOCUMENTS

| 8,812,040 B2 | 8/2014 | Liu et al. |
| 2009/0267581 A1* | 10/2009 | Nentwig ................. H02J 1/102 323/282 |

(Continued)

FOREIGN PATENT DOCUMENTS

| JP | 2001-119309 | 4/2001 |
| JP | 2007-110551 | 4/2007 |

(Continued)

OTHER PUBLICATIONS

Extended European search report, dated Oct. 7, 2014, in corresponding European Patent Application No. 12756919.2.

(Continued)

*Primary Examiner* — Mohammed Rachedine
(74) *Attorney, Agent, or Firm* — Young & Thompson

(57) ABSTRACT

A transmission power adjustment value acquisition unit references a transmission power/adjustment value table to output a transmission power adjustment value for transmission power. A transmission frequency correction value acquisition unit references a transmission frequency/correction value table to output a transmission power correction value, from a center frequency of the position of an RB that is sent from a used transmission frequency calculation unit and that will actually be used. An adjustment value addition unit adds the adjustment value for the obtained transmission power and the transmission power correction value for the center value of the position of the RB that will actually be used, and calculates the transmission power setting. Since the transmission power correction value is obtained from the center frequency of the position of the RB actually transmitted, misalignment between the transmission power setting and the actual transmission power is reduced.

7 Claims, 24 Drawing Sheets

(51) Int. Cl.
*H04B 1/04* (2006.01)
*H04W 52/22* (2009.01)
*H04W 52/52* (2009.01)
*H04L 27/26* (2006.01)

(52) U.S. Cl.
CPC ..... *H04W 52/52* (2013.01); *H04B 2001/0416* (2013.01); *H04L 27/2636* (2013.01); *Y02B 60/50* (2013.01)

(56) References Cited

U.S. PATENT DOCUMENTS

| | | | | |
|---|---|---|---|---|
| 2010/0255868 | A1* | 10/2010 | Lee | H04W 52/367 455/509 |
| 2011/0319119 | A1 | 12/2011 | Ishii | |
| 2012/0009962 | A1* | 1/2012 | Liu | H04W 52/146 455/509 |

FOREIGN PATENT DOCUMENTS

| | | |
|---|---|---|
| JP | 2009100446 | 5/2009 |
| JP | 2010-171555 | 8/2010 |
| JP | 2010-171931 | 8/2010 |
| JP | 2011-071834 | 4/2011 |
| WO | 2010073290 | 7/2010 |
| WO | 2010074235 | 7/2010 |

OTHER PUBLICATIONS

International Search Report, PCT/ JP2012/050600, Feb. 28, 2012.
3GPP TS 36.101 V8.12.0 (Dec. 2010) 3rd Generation Partnership Project; Technical Specification Group Radio Access Network; Evolved Universal Terrestrial Radio Access (E-UTRA); User Equipment (UE) radio transmission and reception ( Release 8).
3GPP TS 36.211 V10.0.0 (Dec. 2010) 3rd Generation Partnership Project; Technical Specification Group Radio Access Network; Evolved Universal Terrestrial Radio Access (E-TRA); Physical channels and modulations (Release 10).

* cited by examiner

FIG. 6

TRANSMISSION POWER – ADJUSTMENT VALUE TABLE

| TRANSMISSION POWER | TRANSMISSION POWER ADJUSTMENT VALUE |
|---|---|
| +24dBm | 900 |
| +20dBm | 850 |
| +16dBm | 800 |
| +12dBm | 750 |
| +8dBm | 700 |
| +4dBm | 650 |
| +0dBm | 600 |
| ... | ... |
| -36dBm | 150 |
| -40dBm | 100 |
| -44dBm | 50 |

TRANSMISSION FREQUENCY – CORRECTION VALUE TABLE

| CORRECTION TBL NO | $N_{UL}$ | FREQUENCY | TRANSMISSION POWER CORRECTION VALUE |
|---|---|---|---|
| 1 | 18000 | 1920.0MHz | -100 |
| 2 | 18014 | 1921.4MHz | -80 |
| 3 | 18028 | 1922.8MHz | -60 |
| 4 | 18042 | 1924.2MHz | -40 |
| ... | ... | ... | ... |
| 22 | 18294 | 1949.4MHz | 0 |
| 23 | 18308 | 1950.8MHz | +20 |
| ... | ... | ... | ... |
| 41 | 18560 | 1976.0MHz | +60 |
| 42 | 18574 | 1977.4MHz | +80 |
| 43 | 18588 | 1978.8MHz | +100 |

~62

TRANSMISSION FREQUENCY - CORRECTION VALUE TABLE

| RB | FREQUENCY | APPLIED CORRECTION VALUE TBL |
|---|---|---|
| #0 | 1920.64MHz | 3 |
| #1 | 1920.82MHz | 3 |
| #2 | 1921.00MHz | 3 |
| #3 | 1921.18MHz | 3 |
| #4 | 1921.36MHz | 3 |
| #5 | 1921.54MHz | 3 |
| #6 | 1921.72MHz | 3 |
| #7 | 1921.90MHz | 3 |
| #8 | 1922.08MHz | 3 |
| #9 | 1922.26MHz | 3 |
| #10 | 1922.44MHz | 3 |
| #11 | 1922.62MHz | 3 |
| #12 | 1922.80MHz | 3 |
| #13 | 1922.98MHz | 3 |
| #14 | 1923.16MHz | 3 |
| #15 | 1923.34MHz | 3 |
| #16 | 1923.52MHz | 3 |
| #17 | 1923.70MHz | 3 |
| #18 | 1923.88MHz | 3 |
| #19 | 1924.06MHz | 3 |
| #20 | 1924.24MHz | 3 |
| #21 | 1924.42MHz | 3 |
| #22 | 1924.60MHz | 3 |
| #23 | 1924.78MHz | 3 |
| #24 | 1924.96MHz | 3 |

TRANSMISSION FREQUENCY - CORRECTION VALUE TABLE

| RB | FREQUENCY | APPLIED CORRECTION VALUE TBL |
|---|---|---|
| #0 | 1920.64MHz | 2 |
| #1 | 1920.82MHz | 2 |
| #2 | 1921.00MHz | 2 |
| #3 | 1921.18MHz | 2 |
| #4 | 1921.36MHz | 2 |
| #5 | 1921.54MHz | 2 |
| #6 | 1921.72MHz | 2 |
| #7 | 1921.90MHz | 2 |
| #8 | 1922.08MHz | — |
| #9 | 1922.26MHz | — |
| #10 | 1922.44MHz | — |
| #11 | 1922.62MHz | — |
| #12 | 1922.80MHz | — |
| #13 | 1922.98MHz | — |
| #14 | 1923.16MHz | — |
| #15 | 1923.34MHz | — |
| #16 | 1923.52MHz | — |
| #17 | 1923.70MHz | — |
| #18 | 1923.88MHz | — |
| #19 | 1924.06MHz | — |
| #20 | 1924.24MHz | — |
| #21 | 1924.42MHz | — |
| #22 | 1924.60MHz | — |
| #23 | 1924.78MHz | — |
| #24 | 1924.96MHz | — |

TRANSMISSION FREQUENCY - CORRECTION VALUE TABLE

| RB | FREQUENCY | APPLIED CORRECTION VALUE TBL |
|---|---|---|
| #0 | 1920.64MHz | 3 |
| #1 | 1920.82MHz | 3 |
| #2 | 1921.00MHz | 3 |
| #3 | 1921.18MHz | 3 |
| #4 | 1921.36MHz | 3 |
| #5 | 1921.54MHz | 3 |
| #6 | 1921.72MHz | 3 |
| #7 | 1921.90MHz | 3 |
| #8 | 1922.08MHz | — |
| #9 | 1922.26MHz | — |
| #10 | 1922.44MHz | — |
| #11 | 1922.62MHz | — |
| #12 | 1922.80MHz | — |
| #13 | 1922.98MHz | — |
| #14 | 1923.16MHz | — |
| #15 | 1923.34MHz | — |
| #16 | 1923.52MHz | — |
| #17 | 1923.70MHz | — |
| #18 | 1923.88MHz | — |
| #19 | 1924.06MHz | — |
| #20 | 1924.24MHz | — |
| #21 | 1924.42MHz | — |
| #22 | 1924.60MHz | — |
| #23 | 1924.78MHz | — |
| #24 | 1924.96MHz | — |

TRANSMISSION FREQUENCY - CORRECTION VALUE TABLE

| RB | FREQUENCY | APPLIED CORRECTION VALUE TBL |
|---|---|---|
| #0 | 1920.64MHz | — |
| #1 | 1920.82MHz | — |
| #2 | 1921.00MHz | — |
| #3 | 1921.18MHz | — |
| #4 | 1921.36MHz | — |
| #5 | 1921.54MHz | — |
| #6 | 1921.72MHz | — |
| #7 | 1921.90MHz | — |
| #8 | 1922.08MHz | — |
| #9 | 1922.26MHz | — |
| #10 | 1922.44MHz | — |
| #11 | 1922.62MHz | — |
| #12 | 1922.80MHz | — |
| #13 | 1922.98MHz | — |
| #14 | 1923.16MHz | — |
| #15 | 1923.34MHz | — |
| #16 | 1923.52MHz | — |
| #17 | 1923.70MHz | 4 |
| #18 | 1923.88MHz | 4 |
| #19 | 1924.06MHz | 4 |
| #20 | 1924.24MHz | 4 |
| #21 | 1924.42MHz | 4 |
| #22 | 1924.60MHz | 4 |
| #23 | 1924.78MHz | 4 |
| #24 | 1924.96MHz | 4 |

TRANSMISSION FREQUENCY - CORRECTION VALUE TABLE

| RB | FREQUENCY | APPLIED CORRECTION VALUE TBL |
|---|---|---|
| #0 | 1920.64MHz | – |
| #1 | 1920.82MHz | – |
| #2 | 1921.00MHz | – |
| #3 | 1921.18MHz | – |
| #4 | 1921.36MHz | – |
| #5 | 1921.54MHz | – |
| #6 | 1921.72MHz | – |
| #7 | 1921.90MHz | – |
| #8 | 1922.08MHz | – |
| #9 | 1922.26MHz | – |
| #10 | 1922.44MHz | – |
| #11 | 1922.62MHz | – |
| #12 | 1922.80MHz | – |
| #13 | 1922.98MHz | – |
| #14 | 1923.16MHz | – |
| #15 | 1923.34MHz | – |
| #16 | 1923.52MHz | – |
| #17 | 1923.70MHz | 3 |
| #18 | 1923.88MHz | 3 |
| #19 | 1924.06MHz | 3 |
| #20 | 1924.24MHz | 3 |
| #21 | 1924.42MHz | 3 |
| #22 | 1924.60MHz | 3 |
| #23 | 1924.78MHz | 3 |
| #24 | 1924.96MHz | 3 |

FIG. 13

TRANSMISSION FREQUENCY - CORRECTION VALUE TABLE

| CORRECTION TBL NO | $N_{UL}$ | FREQUENCY | TRANSMISSION POWER CORRECTION VALUE |
|---|---|---|---|
| 1 | 18000 | 1920.0MHz | −100 |
| 2 | 18014 | 1921.4MHz | −90 |
| 3 | 18028 | 1922.8MHz | −60 |
| 4 | 18042 | 1924.2MHz | −50 |
| ... | ... | ... | ... |
| 22 | 18294 | 1949.4MHz | 0 |
| 23 | 18308 | 1950.8MHz | +20 |
| ... | ... | ... | ... |
| 41 | 18560 | 1976.0MHz | +60 |
| 42 | 18574 | 1977.4MHz | +80 |
| 43 | 18588 | 1978.8MHz | +100 |

~162

TRANSMISSION FREQUENCY - CORRECTION VALUE TABLE

| RB | FREQUENCY | APPLIED CORRECTION VALUE TBL |
|---|---|---|
| #0 | 1920.64MHz | 2 |
| #1 | 1920.82MHz | 2 |
| #2 | 1921.00MHz | 2 |
| #3 | 1921.18MHz | 2 |
| #4 | 1921.36MHz | 2 |
| #5 | 1921.54MHz | 2 |
| #6 | 1921.72MHz | 2 |
| #7 | 1921.90MHz | 2 |
| #8 | 1922.08MHz | 2 |
| #9 | 1922.26MHz | 3 |
| #10 | 1922.44MHz | 3 |
| #11 | 1922.62MHz | 3 |
| #12 | 1922.80MHz | 3 |
| #13 | 1922.98MHz | 3 |
| #14 | 1923.16MHz | 3 |
| #15 | 1923.34MHz | 3 |
| #16 | 1923.52MHz | 3 |
| #17 | 1923.70MHz | 4 |
| #18 | 1923.88MHz | 4 |
| #19 | 1924.06MHz | 4 |
| #20 | 1924.24MHz | 4 |
| #21 | 1924.42MHz | 4 |
| #22 | 1924.60MHz | 4 |
| #23 | 1924.78MHz | 4 |
| #24 | 1924.96MHz | 4 |

FIG. 17

TRANSMISSION POWER - APC ADJUSTMENT VALUE TABLE

| TRANSMISSION POWER | APC ADJUSTMENT VALUE |
|---|---|
| +24dBm | 1.3V |
| +20dBm | 1.2V |
| +16dBm | 1.1V |
| +12dBm | 1.0V |
| +8dBm | 0.9V |
| +4dBm | 0.8V |
| +0dBm | 0.7V |

TRANSMISSION FREQUENCY - APC CORRECTION VALUE TABLE

| CORRECTION TBL NO | $N_{UL}$ | FREQUENCY | APC CORRECTION VALUE |
|---|---|---|---|
| 1 | 18000 | 1920.0MHz | -0.10V |
| 2 | 18014 | 1921.4MHz | -0.08V |
| 3 | 18028 | 1922.8MHz | -0.06V |
| 4 | 18042 | 1924.2MHz | -0.05V |
| ... | ... | ... | ... |
| 22 | 18294 | 1949.4MHz | 0 |
| 23 | 18308 | 1950.8MHz | +0.01V |
| ... | ... | ... | ... |
| 41 | 18560 | 1976.0MHz | +0.06V |
| 42 | 18574 | 1977.4MHz | +0.08V |
| 43 | 18588 | 1978.8MHz | +0.10V |

POWER - PA VCC LINEAR INTERPOLATION TABLE

| TRANSMISSION POWER | VCC VOLTAGE |
|---|---|
| +24dBm | 3.5V |
| +20dBm | 3.5V |
| +16dBm | 3.0V |
| +12dBm | 2.5V |
| +8dBm | 2.0V |
| +4dBm | 1.5V |
| +0dBm | 1.5V |
| ... | ... |
| -36dBm | 1.5V |
| -40dBm | 1.5V |
| -44dBm | 1.5V |

TRANSMISSION FREQUENCY - PAVCC CORRECTION VALUE TABLE

| CORRECTION TBL NO | $N_{UL}$ | FREQUENCY | PAVCC CORRECTION VALUE |
|---|---|---|---|
| 1 | 18000 | 1920.0MHz | -0.35V |
| 2 | 18014 | 1921.4MHz | -0.30V |
| 3 | 18028 | 1922.8MHz | -0.20V |
| 4 | 18042 | 1924.2MHz | -0.15V |
| ... | ... | ... | ... |
| 22 | 18294 | 1949.4MHz | 0 |
| 23 | 18308 | 1950.8MHz | +0.10V |
| ... | ... | ... | ... |
| 41 | 18560 | 1976.0MHz | +0.20V |
| 42 | 18574 | 1977.4MHz | +0.25V |
| 43 | 18588 | 1978.8MHz | +0.35V |

— 362

WIRELESS TRANSMISSION DEVICE, POWER CONTROL METHOD AND PROGRAM

TECHNICAL FIELD

The present invention relates to a wireless transmission device, a power control method of the wireless transmission device and a program, and is concerned with, for example, power control in a Long Term Evolution (LTE) terminal

BACKGROUND ART

In a next-generation portable terminal system referred to as LTE, orthogonal frequency division multiple access (OFDMA) is used in downlink, and single carrier frequency division multiple access (SC-FDMA) is used in uplink. In LTE, voice communication is supported by means of voice over Internet protocol (VoIP), and a bandwidth of the signal is variable among 1.4 MHz, 3 MHz, 5 MHz, 10 MHz, 15 MHz, and 20 MHz.

When a transmission signal bandwidth is widened in SC-FDMA used in LTE, a frequency diversity effect of averaging variation of a propagation path in a frequency domain is enhanced. However, when the bandwidth is extended more than necessary, accuracy in estimation of a propagation path is degraded, and for this reason, a reception characteristic deteriorates. Thus, as shown in FIG. 23, resource blocks (RBs) in a frequency axis direction and subframes in a time axis direction are appropriately allocated to respective users according to an information rate of transmission traffic.

FIG. 24 is an explanatory diagram obtained by simplifying content specified in TABLE. 5.6-1 of Section 5.6 in 3GPP TS36.101. In FIG. 24, a plurality of RBs are arranged in a range of a communication path bandwidths (channel bandwidth). Also, a data transmission bandwidth, that is, a bandwidth of a signal actually used in transmission, is shown by actually used RBs (active resource blocks). As a relationship between the bandwidth of the used signal and RBs of an entire communication path bandwidth, an arrangement of a data transmission bandwidth (transmission bandwidth configuration) is shown. The number of all RBs capable of transmission, that is, the number of all RBs included in a communication path bandwidth will be referred to as a "transmission bandwidth configuration" below, like the "arrangement of a data transmission bandwidth."

FIG. 24 shows that a transmission bandwidth configuration is 25 in a band of 5 MHz. In other words, the maximum number of RBs capable of transmission in a band of 5 MHz is 25. Among these maximum 25 RBs, actually used RBs are eight of block numbers RB#8 to #15.

A method of determining a reference band and adjusting transmission power such that transmission power for a time of the maximum number of RBs becomes an arbitrary power, such as a transmission power adjustment method that is generally employed in a transmission device used in such LTE, and the like, is known (for example, Patent Literature 1). For example, assuming that a reference band is 5 MHz, and used RBs are a maximum of 25 RBs, transmission power is adjusted to be, for example, +23 decibel milliwatts [dBm] (the maximum transmission power specified in TABLE 6.6.2-1 of Section 6.2 in 3GPP TS36.101). In addition, when a bandwidth becomes 1.4 MHz, 3 Hz, 10 MHz, 15 MHz, and 20 MHz, transmission power of a case in which a bandwidth varies is finely adjusted by multiplying by a certain coefficient.

DOCUMENT OF THE PRIOR ART

Patent Document

[Patent Document 1]
Japanese Unexamined Patent Application, First Publication No. 2010-171931

DISCLOSURE OF INVENTION

Problem to be Solved by the Invention

Even when the same maximum number of RBs can be transmitted, positions of block numbers of used RBs may be changed. FIG. 25 shows a case in which positions of used RBs are changed to block numbers RB#0 to #7 with the number of RBs maintained at eight. Also, FIG. 26 shows a case in which positions of used RBs are changed to block numbers RB#17 to #24 with the number of RBs maintained at eight.

Like this, even if there are the same number of RBs, when positions of block numbers of RBs are changed, an actually used frequency varies. Difference in the actually used frequency affects a transmission frequency characteristic of an RFIC, a filter, a power amplifier, or the like of a transmission device, and thus it is likely that a setting value of transmission power will deviate from actual transmission power in the above-described method of determining a reference band and adjusting transmission power such that transmission power for a time of the maximum number of RBs becomes an arbitrary power. In particular, the smaller the number of used RBs, the more obvious the influence is.

FIG. 27 shows a case in which the number of RBs is 25, and all block numbers RB#0 to #24 are used. In this case, a center frequency becomes the same as in the case of FIG. 24, but there is a case in which correction values for frequencies greatly vary in part, and when the same correction value is given as in the case of FIG. 24, it is likely that a setting value of transmission power will deviate from actual transmission power.

An object of the present invention is to provide a wireless transmission device, a power control method, and a program capable of solving the problems described above.

Solution to Problem

In order to achieve the aforementioned objects, a wireless transmission device according to one embodiment of the present invention is a wireless transmission device that allocates resources in a frequency axis direction and a time axis direction to perform communication, including a transmission power adjustment value acquisition unit which acquires a transmission power adjustment value corresponding to transmission power, a transmission frequency correction value acquisition unit which acquires a correction value of the transmission power corresponding to a position of a resource block actually performing transmission, and an adjustment value addition unit which adds the transmission power adjustment value obtained by the transmission power adjustment value acquisition unit and the correction value of the transmission power obtained by the transmission frequency correction value acquisition unit.

A wireless transmission device according to one embodiment of the present invention is a wireless transmission device that allocates resources in a frequency axis direction and a time axis direction to perform communication, including a power amplifier supply voltage adjustment value calculation unit which calculates an adjustment value of a supply voltage of a power amplifier corresponding to transmission power, a power amplifier supply voltage correction value calculation unit which calculates a correction value of the supply voltage of the power amplifier corresponding to a position of a resource block actually performing transmission, and a supply voltage adjustment value addition unit which adds the adjustment value of the supply voltage of the power amplifier obtained by the power amplifier supply voltage adjustment value calculation unit and the correction value of the supply voltage of the power amplifier obtained by the power amplifier supply voltage correction value calculation unit.

A power control method according to one embodiment of the present invention is a power control method of a wireless transmission device that divides a signal band in a frequency axis direction and a time axis direction and allocates resources to perform communication, including acquiring a transmission power adjustment value corresponding to transmission power, acquiring a correction value of the transmission power corresponding to a position of a resource block actually performing transmission, and adding the calculated transmission power adjustment value and the calculated transmission power correction value to control the transmission power.

A power control method according to one embodiment of the present invention is a power control method of a wireless transmission device that allocates resources in a frequency axis direction and a time axis direction to perform communication, including calculating an adjustment value of a supply voltage of a power amplifier corresponding to transmission power, calculating a correction value of the supply voltage of the power amplifier corresponding to a position of a resource block actually performing transmission, and adding the calculated adjustment value of the supply voltage of the power amplifier and the calculated correction value of the supply voltage of the power amplifier to supply the sum to the power amplifier.

A program according to one embodiment of the present invention is a power control program of a wireless transmission device that allocates resources in a frequency axis direction and a time axis direction and allocates resources to perform communication, including a step of acquiring a transmission power adjustment value corresponding to transmission power, a step of acquiring a correction value of the transmission power corresponding to a position of a resource block actually performing transmission, and a step of adding the calculated transmission power adjustment value and the calculated transmission power correction value to control the transmission power.

A program according to one embodiment of the present invention is a power control program of a wireless transmission device that allocates resources in a frequency axis direction and a time axis direction to perform communication, including a step of calculating an adjustment value of a supply voltage of a power amplifier corresponding to transmission power, a step of calculating a correction value of the supply voltage of the power amplifier corresponding to a position of a resource block actually performing transmission, and a step of adding the calculated adjustment value of the supply voltage of the power amplifier and the calculated correction value of the supply voltage of the power amplifier and supplying the sum to the power amplifier.

Effects of the Invention

According to the present invention, it is possible to reduce a difference between set transmission power and actual transmission power.

BRIEF DESCRIPTION OF THE DRAWINGS

FIG. 6 is an explanatory diagram of an example of a transmission power/adjustment value table in the first embodiment of the present invention.

FIG. 7 is an explanatory diagram of an example of a transmission frequency/correction value table in the first embodiment of the present invention.

FIG. 13 is an explanatory diagram of an example of a transmission frequency/correction value table in a second embodiment of the present invention.

FIG. 17 is an explanatory diagram of transmission power and APC adjustment values in the third embodiment of the present invention.

FIG. 18 is an explanatory diagram relating to a transmission frequency and APC correction value table in the third embodiment of the present invention.

FIG. 21 is an explanatory diagram for transmission power and VCC voltage in the fourth embodiment of the present invention.

FIG. 22 is an explanatory diagram relating to a transmission frequency and PAVCC correction value table in the fourth embodiment of the present invention.

DESCRIPTION OF EMBODIMENTS

Hereinafter, embodiments of the present invention will be described with reference to the drawings.

First Embodiment

Figure 1:
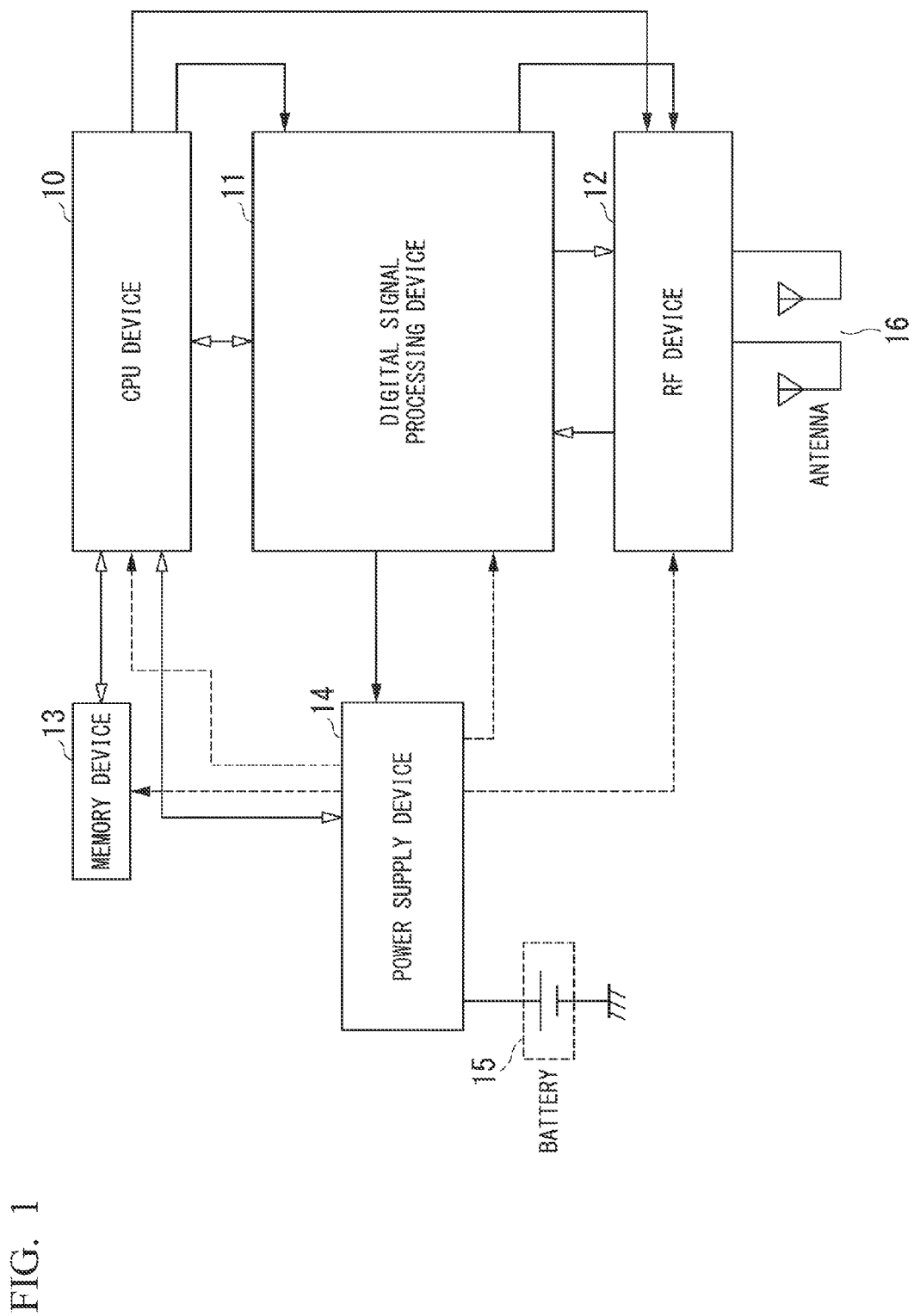
FIG. 1 is a block diagram showing a configuration of a wireless communication terminal relating to a first embodiment of the present invention.

FIG. 1 is a block diagram showing a configuration of a wireless communication terminal relating to a first embodiment of the present invention. The wireless communication terminal relating to the first embodiment of the present invention can be used as an LTE terminal. As shown in FIG. 1, the wireless communication terminal relating to the first embodiment of the present invention has a central processing unit (CPU) device 10, a digital signal-processing device 11, a radio frequency (RF) device 12, a memory device 13, a power supply device 14, a battery 15, and an antenna 16.

The CPU device 10 controls the digital signal-processing device 11, the RF device 12, the memory device 13, and the power supply device 14, and also exchanges data with the digital signal-processing device 11.

The RF device 12 demodulates a received wireless signal, performs A/D conversion on the demodulated signal, and outputs the A/D converted signal to the digital signal-processing device 11. Also, the RF device 12 receives a signal from the digital signal-processing device 11, performs D/A conversion on the received signal, and converts the D/A converted signal into a signal to be transmitted. Further, the RF device 12 detects a transmission signal for automatic power control (APC), and performs DC voltage conversion (direct current conversion) and A/D conversion on the detected transmission signal, thereby generating an APC detection signal.

Control of transmission power will be described later.

The digital signal-processing device 11 performs a process on the digital signal that is the received signal demodulated, A/D converted, and output by the RF device 12, decodes the digital signal, and outputs the decoded digital signal to the CPU device 10. Also, the digital signal-processing device 11 receives an output of a signal that should be transmitted from the CPU device 10, encodes the signal, and outputs the encoded signal to the RF device 12. In the LTE terminal, an SC-OFDM process is performed as an uplink process. In other words, the digital signal-processing device 11 encodes the signal that is output from the CPU device 10 and should be transmitted according to a communication standard of SC-OFDM.

Also, the digital signal-processing device 11 adjusts transmission power using the APC detection signal from the RF device 12. Here, the digital signal-processing device 11 in this embodiment does not use a center frequency of a transmission band but uses a correction value of a center frequency of positions of actually transmitted RBs when it adjusts transmission power. This will be described later.

The memory device 13 stores control information and various data such as adjustment values for RF transmission, RF reception, and the like. In particular, the memory device 13 stores a transmission power/adjustment value table 61 (see FIG. 6) in which transmission power adjustment values for transmission power are written, and a transmission frequency/correction value table 62 (see FIG. 7) in which transmission power correction values for transmission frequencies are written.

The power supply device 14 supplies a voltage (power) to the CPU device 10, the digital signal-processing device 11, the RF device 12, or the memory device 13 according to control of the CPU device 10 or control of the digital signal-processing device 11. In addition, the power supply device 14 applies a power amplifier supply voltage PA_VCC to a power amplifier 24 of the RF device 12.

The battery 15 supplies a voltage to all of the devices via the power supply device 14. The antenna 16 receives a signal from a base station, and also transmits a signal from the terminal. In the case of LTE, multiple input multiple output (MIMO) technology is employed, and thus the antenna 16 is configured with two antennas.

Figure 2:
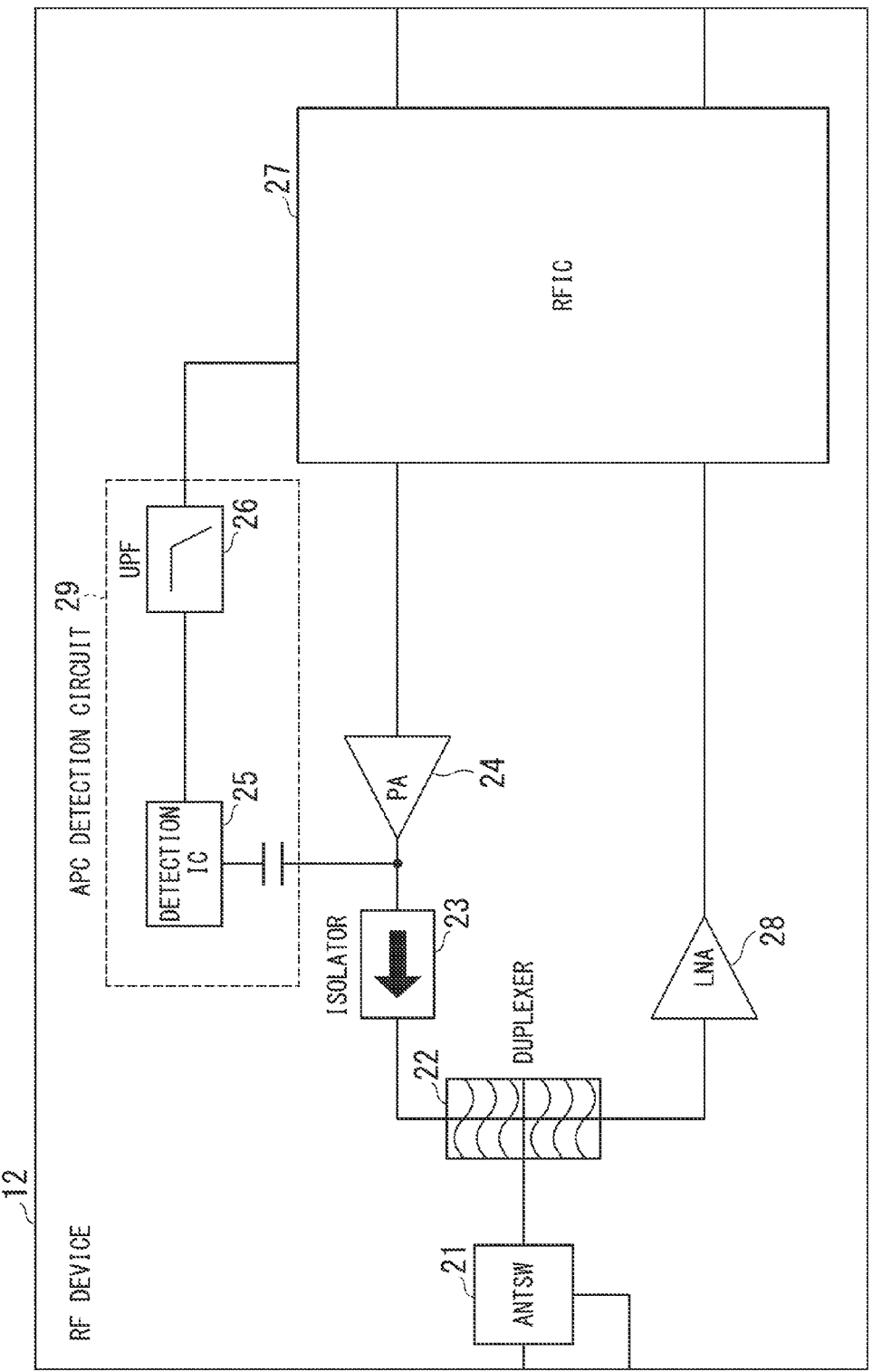
FIG. 2 is a block diagram showing a configuration of an RF device in the wireless communication terminal relating to the first embodiment of the present invention.

FIG. 2 is a block diagram showing a configuration of the RF device 12. As shown in FIG. 2, the RF device 12 has an antenna switch 21, a duplexer 22, an isolator 23, a power amplifier 24, a detection integrated circuit (IC) 25, a low-pass filter (LPF) 26, a radio frequency integrated circuit (RFIC) 27, and a low-noise amplifier (LNA) 28.

The antenna switch 21 is a switch that switches antennas used by the RF device 12. The duplexer 22 is a filter that separates a transmission signal and a reception signal. The isolator 23 prevents countercurrent of a high power transmission signal. The power amplifier 24 is a high-output amplifier that amplifies power of the transmission signal. The LNA 28 is an amplifier that amplifies the reception signal with low noise.

The detection IC 25 is an integrated circuit for detecting a transmission signal level, converting the detected level of the transmission signal into a DC voltage, and outputting the DC voltage. The LPF 26 is a filter that attenuates noise in the detected level DC voltage of the transmission signal. The detection IC 25 and the LPF 26 configure an APC detection circuit 29.

The RFIC 27 is an integrated circuit for processing transmission and reception, and includes a modulation and demodulation circuit, variable gain amplifiers for transmission and reception, a baseband filter, an A/D converter, a D/A converter, a low-voltage differential signaling (LVDS) circuit, an amplifier, a phase-locked loop (PLL) synthesizer, and the like.

Figure 3:
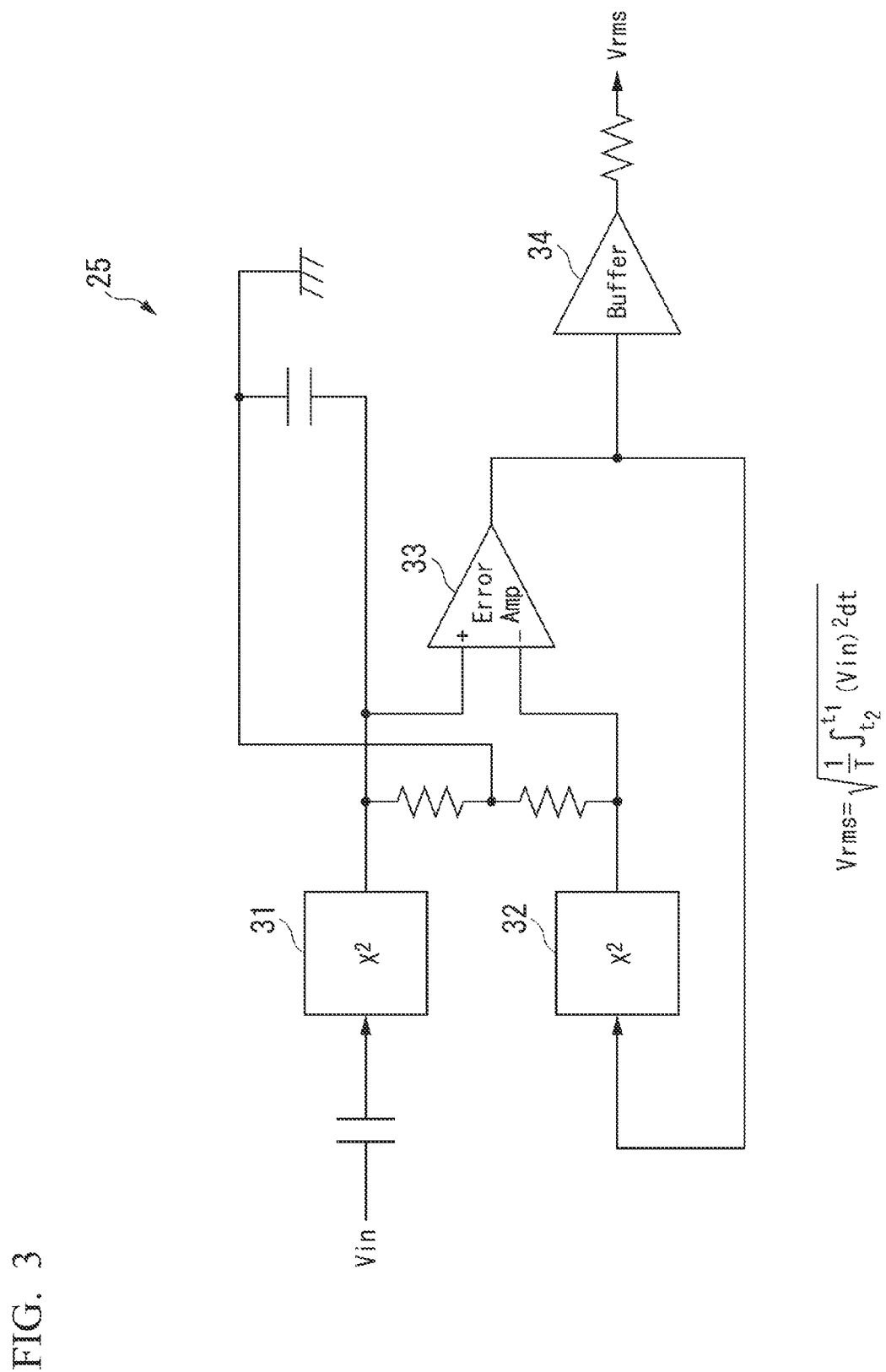
FIG. 3 is a block diagram showing a configuration of a detection IC in the RF device of the wireless communication terminal relating to the first embodiment of the present invention.

FIG. 3 is a block diagram showing a configuration of the detection IC 25 in the above-described RF device 12. As described above, the detection IC 25 detects the transmission signal level, converts the detected level of the transmission signal into the DC voltage, and outputs the DC voltage. As shown in FIG. 3, the detection IC 25 has square devices 31 and 32, an error amplifier 33, and a buffer 34. When a transmission signal Vin is input, the detection IC 25 outputs a root-mean-square value Vrms. At this time, a relationship becomes an expression shown in FIG. 3.

Figure 4:
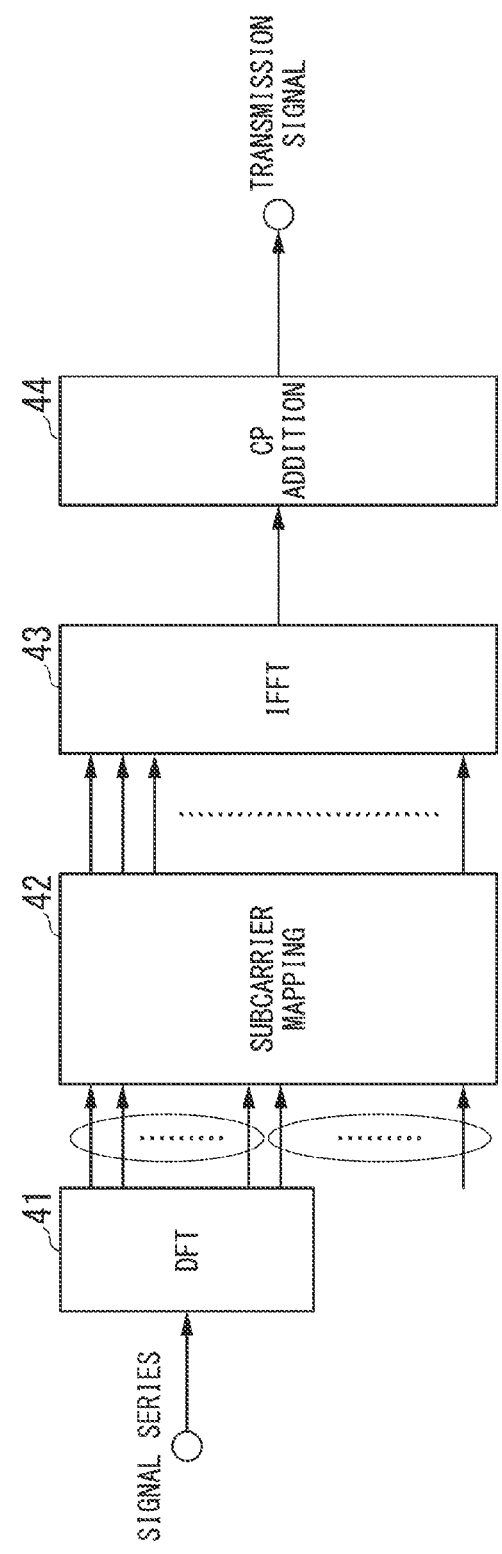
FIG. 4 is a block diagram showing a configuration of an SC-FDMA transmission-processing unit relating to the first embodiment of the present invention.

FIG. 4 is a block diagram showing a configuration of an SC-FDMA transmission-processing unit that the digital signal-processing device 11 has. As shown in FIG. 4, the SC-FDMA processing unit has a discrete Fourier transform (DFT) unit 41, a subcarrier mapping unit 42, an inverse fast Fourier transform (IFFT) unit 43, and a cyclic prefix (CP) addition unit 44.

The DFT unit 41 performs a discrete Fourier transform on time-series information symbols that are encoded by the digital signal-processing device 11 and also modulated, thereby converting the time-series information symbols into a frequency series.

The subcarrier mapping unit 42 maps the information symbols converted into the frequency series to a frequency band (subcarriers). Here, the subcarrier mapping unit 42 maps "0" to a frequency band other than bands that have been allocated the information symbols. The "subcarriers" mentioned herein are specified in TABLE 6.2.3-1 of Section 6.2.3 of 3GPP TS36.211. A frequency interval of one subcarrier is 15 kHz, and a collection of 12 subcarriers is a resource block (RB).

The IFFT unit 43 performs an inverse fast Fourier transform on the information symbols or all series to which 0 is mapped.

The CP addition unit 44 adds a cyclic prefix (CP) to a transmission signal. The "cyclic prefix" mentioned herein is a guard section provided to remove intersymbol interference that is imposed on a next OFDM symbol by a delayed wave of a symbol or inter-subcarrier interference caused by loss of orthogonality between subcarriers.

These respective units perform generation of a transmission signal, and thereby a transmission band, the number of RBs, and positions of the RBs are determined.

Figure 5:
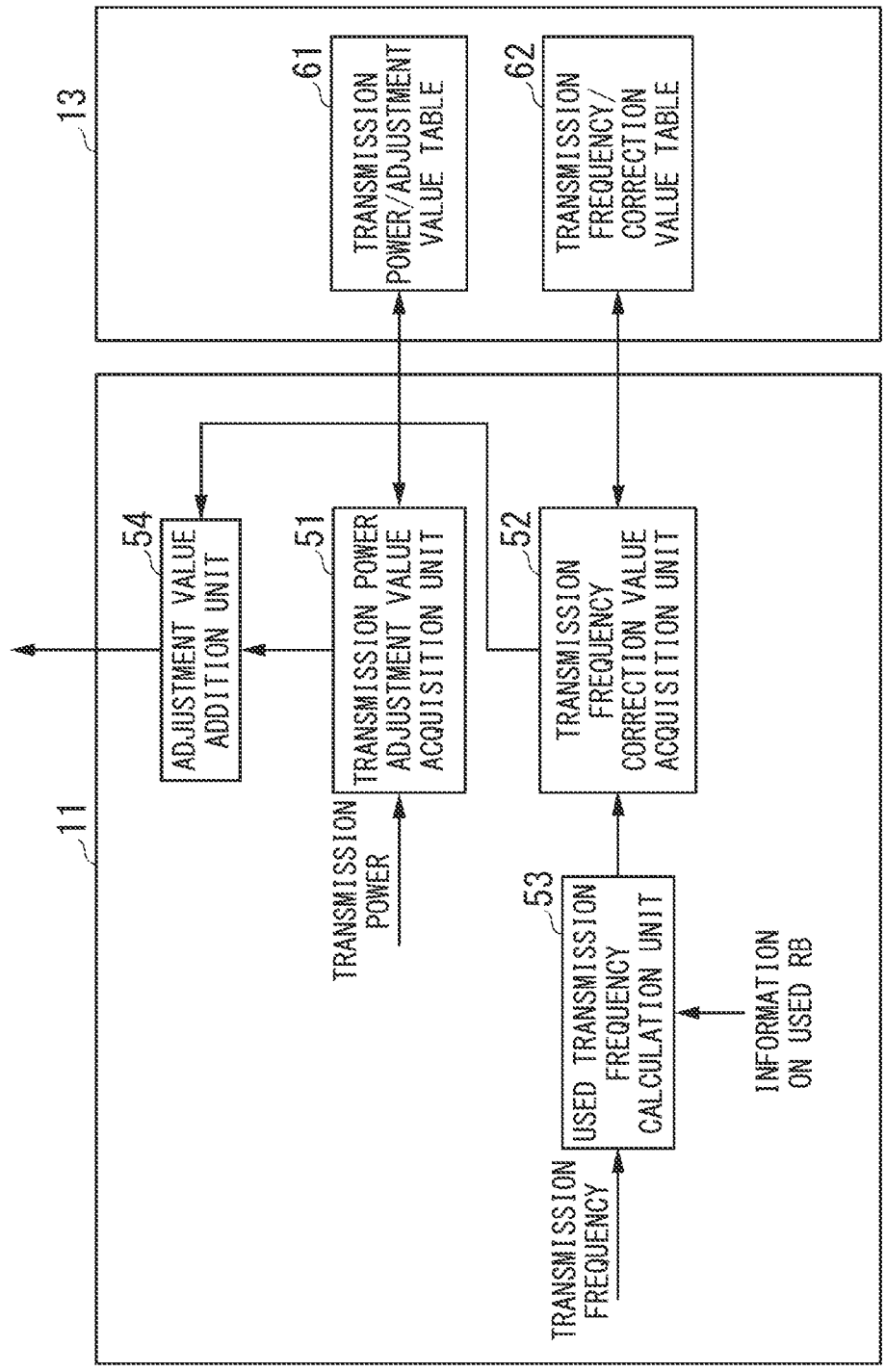
FIG. 5 is a block diagram of a functional part for describing an outline of power control in the first embodiment of the present invention.

Next, power control in this embodiment will be described. FIG. 5 is a block diagram of a functional part for describing an outline of power control in this embodiment.

In FIG. 5, the digital signal-processing device 11 has a transmission power adjustment value acquisition unit 51, a transmission frequency correction value acquisition unit 52, a used transmission frequency calculation unit 53, and an adjustment value addition unit 54. Also, the memory device 13 stores a transmission power/adjustment value table 61 and a transmission frequency/correction value table 62. The digital signal-processing device 11 may access the memory device 13 through the CPU device 10, or directly access the memory device 13.

In the transmission power/adjustment value table 61, transmission power adjustment values for transmission power are written. In FIG. 6, an example of the transmission power/adjustment value table 61 is shown.

In the transmission frequency/correction value table 62, transmission power correction values for transmission power are written. In FIG. 7, an example of the transmission frequency/correction value table 62 is shown. This table is an example of a case of E-UTRA operating band 1 of TABLE 5.7.3-1 of Section 5.7.3 in 3GPP TS36.101, and since the smallest one of bands is 1.4 MHz, correction values are provided at intervals of 1.4 MHz. Here, a relational expression between frequencies FUL and NUL is as shown in Expression (1).

$$FUL=FUL\_low+0.1\times(NUL-NUL\_NOffs) \quad \text{Expression (1)}$$

Expression (1) is an expression for obtaining a frequency from a channel number (E-UTRA absolute radio frequency channel number (EARFCN)) allocated in LTE and used in communication and the like.

Here, FUL_low is a lower limit of a frequency range allocated to Band-I, and is 1920 MHz in the case of Band-1.

NUL is a channel number for transmission (uplink), and 18000 to 18599 are allocated in the case of Band-1.

NUL_NOffs is an offset, and becomes 18000 in the case of Band-1.

For example, when it is satisfied that NUL=18300 in Band-1, the respective above values are applied to Expression (1), and it is satisfied that FUL=1920+0.1×(18300−18000)=1950 [MHz].

In addition, for example, when the wireless communication terminal performs transmission with a transmission power of +24 dBm and a center frequency of 1922.8 MHz, the transmission power/adjustment value table 61 of FIG. 6 shows that an adjustment value should be "900" based on the transmission power of +24 dBm. Also, the transmission frequency/correction value table 62 of FIG. 7 shows that a transmission power correction value should be "−60" shown in a row of a correction table number "3" based on the center frequency of 1922.8 MHz. Accordingly, in this case, transmission power is set to 840 (=900−60) obtained by adding −60 to 900 that is an adjustment value of +24 dBm.

In FIG. 5, the transmission power adjustment value acquisition unit 51 searches the transmission power/adjustment value table 61 using transmission power as a key, and acquires and outputs a transmission power adjustment value to the adjustment value addition unit 54.

The used transmission frequency calculation unit 53 calculates a center frequency of positions of actually used RBs from transmission frequencies and RB position information.

The transmission frequency correction value acquisition unit 52 searches the transmission frequency/correction value table 62 using the center frequency of the positions of the actually used RBs calculated by the used transmission frequency calculation unit 53 as a key, and acquires and outputs a transmission power correction value to the adjustment value addition unit 54.

The adjustment value addition unit 54 adds the adjustment value for transmission power obtained by the transmission power adjustment value acquisition unit 51 and the transmission power correction value for the center frequency of the positions of the actually used RBs obtained by the transmission frequency correction value acquisition unit 52, thereby calculating a transmission power setting value. The transmission power setting value obtained in this way is set in the variable gain amplifier for transmission of the RFIC 27.

In this way, the wireless communication terminal of this embodiment controls transmission power based on a value obtained by adding an adjustment value for the transmission power and a transmission power correction value for a center frequency of positions of actually used RBs. For this reason, in the first embodiment of the present invention, a difference between a setting value of transmission power and actual transmission power is reduced, and it is possible to reduce transmission power consumption as a result of stabilizing transmission power.

For example, it is assumed that the table shown in FIG. 6 is used as the transmission power/adjustment value table 61. Also, it is assumed that the table shown in FIG. 7 is used as the transmission frequency/correction value table 62. Here, as shown in FIG. 8A and FIG. 8B, it is assumed that transmission is performed when a center frequency of a transmission signal is 1922.8 MHz, a band is 5 MHz, the maximum number of RBs is 25, and a transmission power is +24 dBm.

In this case, since the transmission power is +24 dBm, the transmission power adjustment value acquisition unit 51 outputs 900 as an adjustment value for the transmission power of +24 dBm based on the transmission power/adjustment value table 61 of FIG. 6.

Figures 8A, 8B:
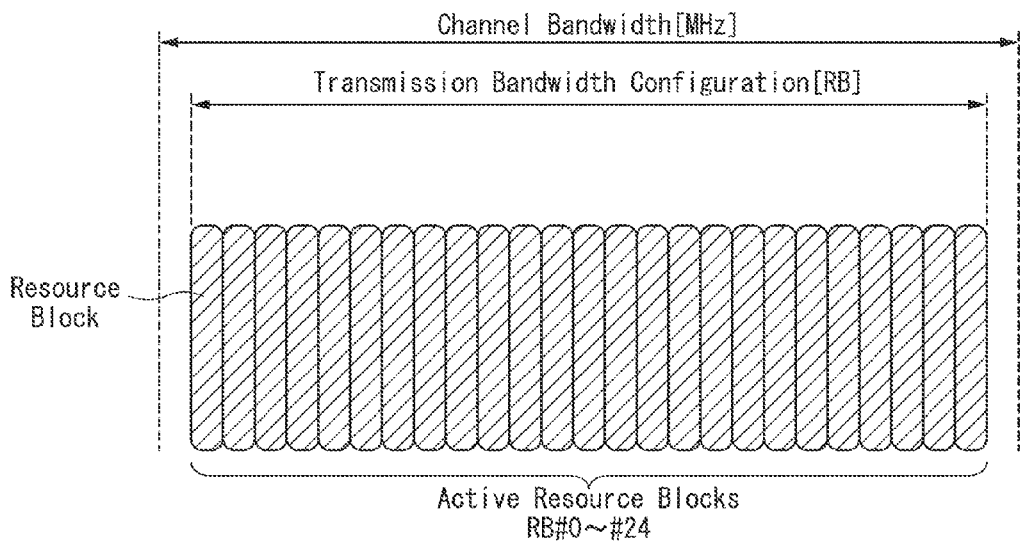
FIG. 8A is an explanatory diagram showing an example of a case of using resource block #0 to resource block #24 in the first embodiment of the present invention.
FIG. 8B is an explanatory diagram showing a transmission frequency and correction value table in the first embodiment of the present invention.

Also, when there are 25 RBs, as shown in FIG. 8A and FIG. 8B, a center frequency of a transmission signal is 1922.8 MHz and the same as a center frequency of actual positions of the RBs. Therefore, based on the transmission frequency/correction value table 62 shown in FIG. 7, the transmission frequency correction value acquisition unit 52 outputs −60 of correction table number #3 as a transmission power correction value for 1922.8 MHz.

The adjustment value addition unit 54 adds the adjustment value of 900 output from the transmission power adjustment value acquisition unit 51 and the correction value of −60 output from the transmission frequency correction value acquisition unit 52. In other words, the adjustment value addition unit 54 calculates 840 (=900−60) as a transmission power setting value by adding the transmission power adjustment value of 900 and the transmission power correction value of −60 for the frequency.

Like this, when the maximum number of RBs is 25, a center frequency of a transmission band is the same as a center frequency of positions of actually transmitted RBs. Accordingly, a setting value of transmission power of this case becomes the same as that of a method of adjusting transmission power based on a center frequency of a transmission band.

Figures 9A, 9B:
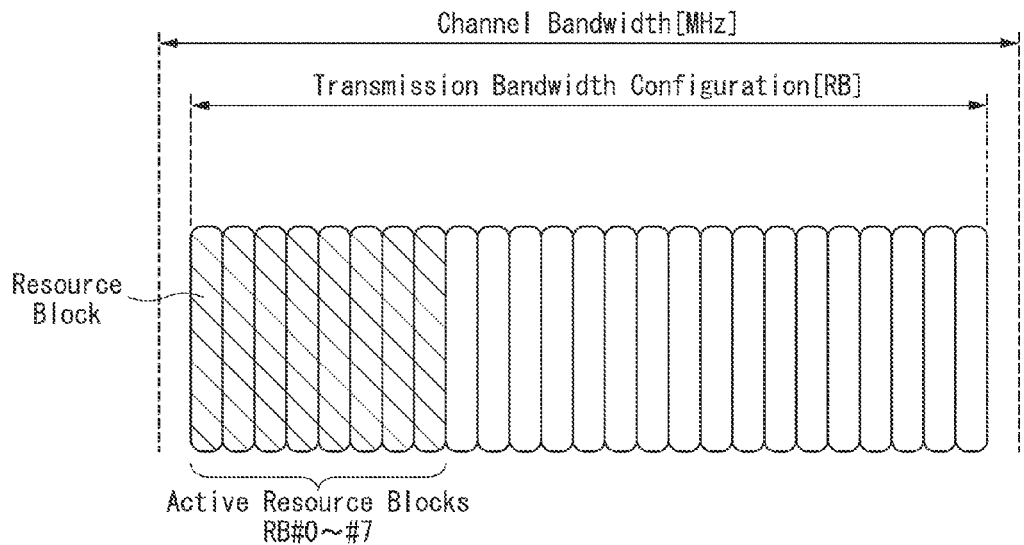
FIG. 9A is an explanatory diagram showing an example of a case of using resource block #0 to resource block #7 in the first embodiment of the present invention.
FIG. 9B is an explanatory diagram showing a transmission frequency and correction value table in the first embodiment of the present invention.

Next, as shown in FIG. 9A and FIG. 9B, it is assumed that a center frequency of a transmission signal is 1922.8 MHz, a band is 5 MHz, the number of RBs is 8, and positions of the RBs are block numbers #0 to #7. Also, it is assumed that a transmission power is +24 dBm.

In this case, based on the transmission power/adjustment value table 61 of FIG. 6, the transmission power adjustment value acquisition unit 51 acquires 900 as an adjustment value for the transmission power of +24 dBm, and outputs the acquired adjustment value to the adjustment value addition unit 54. Also, since the center frequency of the transmission signal is 1922.8 MHz, and the positions of the RBs are block numbers #0 to #7, positions of the actually transmitted RBs are 1920.64 MHz to 1921.90 MHz as shown in FIG. 9A and FIG. 9B. Therefore, the transmission frequency correction value acquisition unit 52 selects correction table number #2 from the transmission frequency/correction value table 62 shown in FIG. 7. Also, the transmission frequency correction value acquisition unit 52 acquires −80 of correction table number #2 as a transmission power correction value, and outputs the acquired transmission power correction value to the adjustment value addition unit 54.

The adjustment value addition unit 54 adds the adjustment value of 900 output from the transmission power adjustment value acquisition unit 51 and the correction value of −80 output from the transmission frequency correction value acquisition unit 52. In other words, the adjustment value addition unit 54 calculates 820 (=900−80) as a transmission power setting value by adding the transmission power correction value of −80 for the frequency to the transmission power adjustment value of 900.

Figures 10A, 10B:
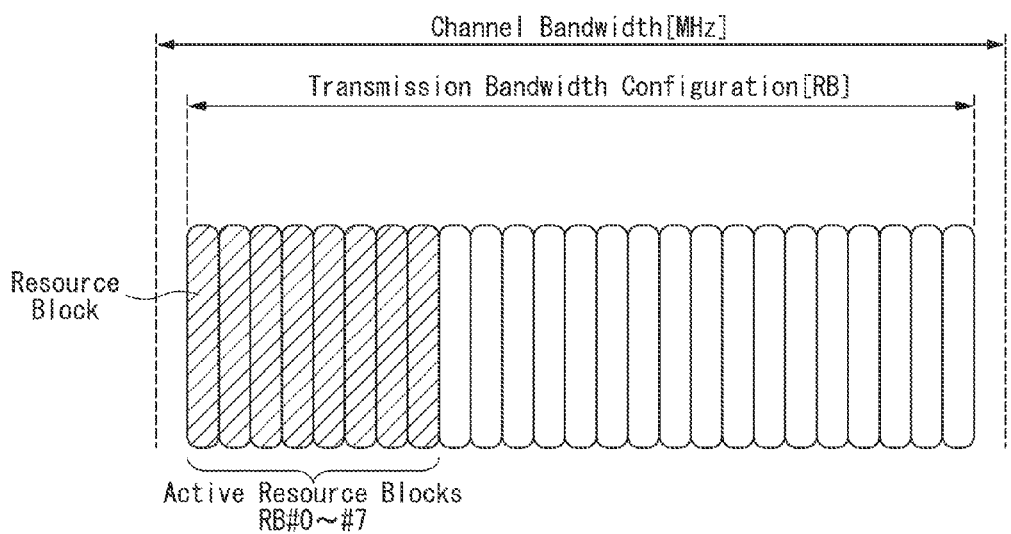
FIG. 10A is an explanatory diagram showing an example of a case of using resource block #0 to resource block #7 in a method of adjusting transmission power based on a center frequency of a transmission band relating to the first embodiment of the present invention.
FIG. 10B is an explanatory diagram showing a transmission frequency and correction value table in the first embodiment of the present invention.

On the other hand, in a method of adjusting transmission power based on a center frequency of a transmission band, when a center frequency is 1922.8 MHz, and a band is 5 MHz, −60 of correction table number #3 is applied by way of the transmission frequency/correction value table as shown in FIG. 10A and FIG. 10B, and 840 (=900−60) obtained by adding −60 to 900 that is an adjustment value of +24 dBm becomes a setting value of transmission power. For this reason, while frequencies of actually transmitted block numbers #0 to 7 are 1920.64 to 1921.90 MHz, a center frequency differs from 1922.8 MHz. The difference affects a transmission frequency characteristic of an RFIC, a filter, a power amplifier, or the like, and thus it is likely that a setting value of transmission power will deviate from actual transmission power.

Figures 11A, 11B:
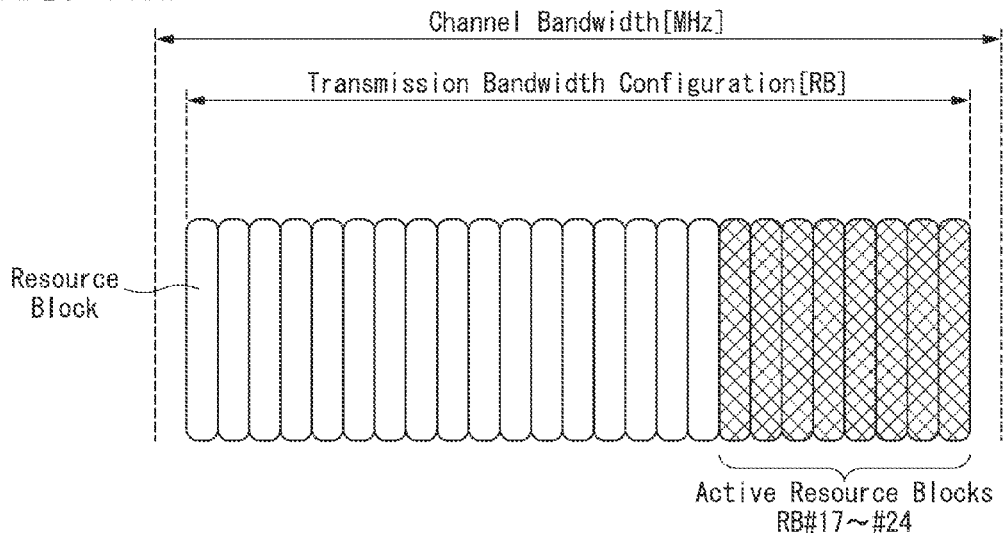
FIG. 11A is an explanatory diagram showing an example of a case of using resource block #17 to resource block #24 in the first embodiment of the present invention.
FIG. 11B is an explanatory diagram showing a transmission frequency and correction value table in the first embodiment of the present invention.

As shown in FIG. 11A and FIG. 11B, it is assumed that a center frequency of a transmission signal is 1922.8 MHz, a band is 5 MHz, the number of RBs is 8, and positions of the RBs are block numbers #17 to #24 Also, it is assumed that a transmission power is +24 dBm.

In this case, based on the transmission power/adjustment value table 61 of FIG. 6, the transmission power adjustment value acquisition unit 51 acquires 900 as an adjustment value for the transmission power of +24 dBm, and outputs the acquired adjustment value to the adjustment value addition unit 54. Also, since the center frequency of the transmission signal is 1922.8 MHz, and the positions of the RBs are block numbers #17 to #24, frequencies of the positions of the actually transmitted RBs are 1923.70 MHz to 1924.96 MHz as shown in FIG. 11B. Therefore, the transmission frequency correction value acquisition unit 52 selects correction table number #4 from the transmission frequency/correction value table 62 shown in FIG. 7. Also, the transmission frequency correction value acquisition unit 52 acquires −40 of correction table number #4 as a transmission power correction value, and outputs the acquired transmission power correction value to the adjustment value addition unit 54.

The adjustment value addition unit 54 adds the adjustment value of 900 output from the transmission power adjustment value acquisition unit 51 and the correction value of −40 output from the transmission frequency correction value acquisition unit 52. In other words, the adjustment value addition unit 54 calculates 860 (=900−40) as a transmission power setting value by adding the transmission power correction value of −40 for the frequency to the transmission power adjustment value of 900.

Figures 12A, 12B:
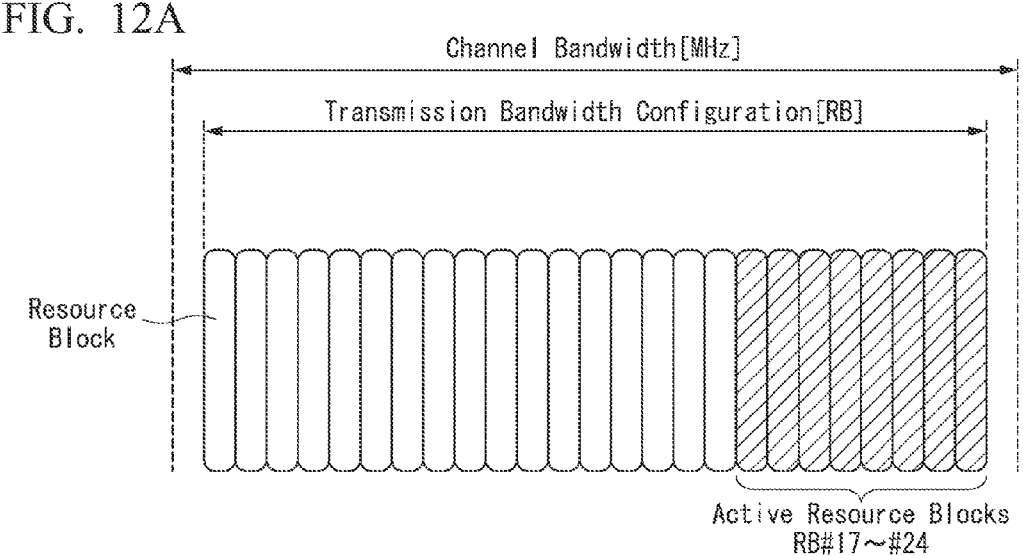
FIG. 12A is an explanatory diagram showing an example of a case of using resource block #17 to resource block #24 in a method of adjusting transmission power based on a center frequency of a transmission band relating to the first embodiment of the present invention.
FIG. 12B is an explanatory diagram showing a transmission frequency and correction value table in the first embodiment of the present invention.

On the other hand, in the method of adjusting transmission power based on a center frequency of a transmission band, when a center frequency is 1922.8 MHz, a band is 5 MHz, the number of RBs is 8, and positions of the RBs are block numbers #17 to 24, −60 of correction table number #3 is applied by way of the transmission frequency/correction value table as shown in FIG. 12A and FIG. 12B, and 840 (=900−60) obtained by adding −60 to 900 that is an adjustment value of +24 dBm becomes a setting value of transmission power. In this case, while frequencies of actually transmitted block numbers #0 to 7 are 1923.70 to 1924.96 MHz, a center frequency differs from 1922.8 MHz. The difference affects a transmission frequency characteristic of an RFIC, a filter, a power amplifier, or the like, and thus it is likely that a setting value of transmission power will deviate from actual transmission power.

In this way, in the first embodiment of the present invention, the used transmission frequency calculation unit 53 calculates a center frequency of positions of RBs that actually perform transmission from transmission frequencies and position information on the RBs used as band information, and obtains a transmission power correction value from the center frequency of the positions of the RBs that actually perform transmission. For this reason, in the first embodiment of the present invention, a difference between a setting value of transmission power and actual transmission power is reduced.

Second Embodiment

Next, a second embodiment of the present invention will be described. In the first embodiment described above, when an allocated RB includes a center frequency of a transmission band, a setting value of transmission power is set based on the center frequency of the transmission band. In other words, as shown in FIG. 8A and FIG. 8B, when a center frequency is 1922.8 MHz, a band is 5 MHz, and the maximum number of RBs is 25, the center frequency is included in the used RB, and thus correction table number #3 of the transmission frequency/correction value table 62 is applied as it is.

When frequency correction values of a transmission frequency/correction value table greatly vary in part only as shown in FIG. 13, in the first embodiment, 840 (=900−60) obtained by adding −60 of correction table number #3 of FIG. 13 to 900 that is an adjustment value of +24 dBm of FIG. 6 becomes a transmission power setting value, and deviates from transmission power. This problem has a greater influence as the band becomes wider in 10 MHz, 15 MHz, and 20 MHz.

To solve this problem, in the second embodiment of the present invention, power is set with high accuracy by dividing RBs into a plurality of groups, obtaining correction values for the respective groups using a correction table, adding weights to the correction values according to allocation numbers, and obtaining a transmission power setting value.

Figure 14:
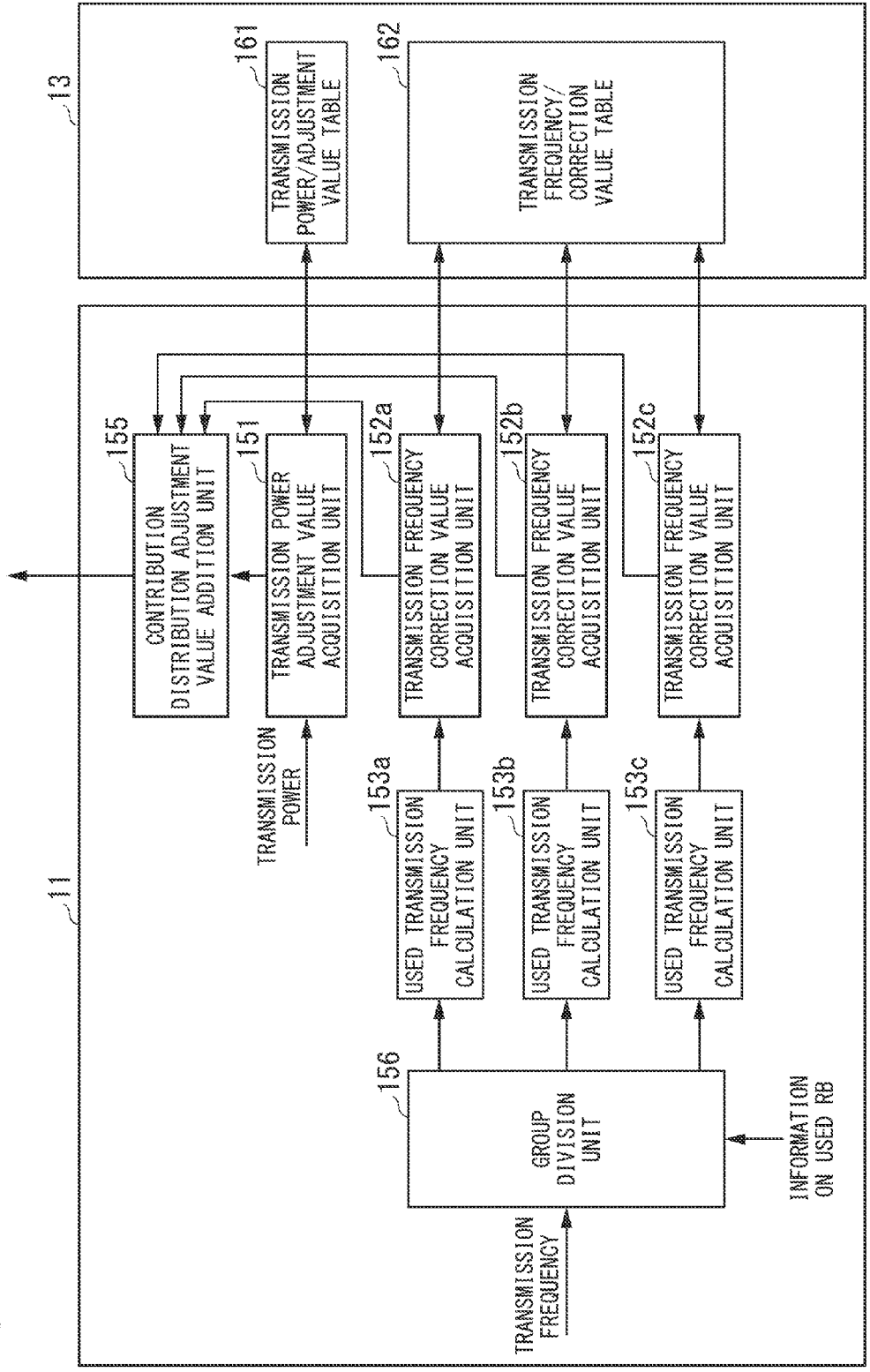
FIG. 14 is a block diagram of a functional part for describing an outline of power control in the second embodiment of the present invention.

FIG. 14 is a block diagram of a functional part for describing an outline of power control in the second embodiment of the present invention. A digital signal-processing device 11 in this embodiment has a group division unit 156 and a contribution distribution adjustment value addition unit 155 in addition to the respective units that the digital signal-processing device 11 (FIG. 5) of the first embodiment has. Also, the digital signal-processing device 11 in this embodiment has used transmission frequency calculation units 153a, 153b and 153c, and transmission frequency correction value acquisition units 152a, 152b and 152c for respective groups.

The group division unit 156 divides RBs into a plurality of groups. For example, the group division unit 156 divides 25 RBs of block numbers RB#0 to RB#24 into a group of block numbers RB#0 to RB#8, a group of block numbers RB#9 to RB#16, and a group of block numbers RB#17 to RB#24.

Here, the division number "3" is an example for the group division unit 156 of this embodiment, and a division number of RBs is not limited thereto. The group division unit 156 may divide RBs into two or more groups.

The used transmission frequency calculation units 153a, 153b and 153c obtain center frequencies of positions of actually transmitted RBs according to the respective groups. The respective transmission frequency correction value acquisition units 152a, 152b and 153c calculate transmission power correction values according to the respective groups with reference to the transmission frequency/correction value table 161.

The contribution distribution adjustment value addition unit 155 adds the group-specific transmission power correction values from the transmission frequency correction value acquisition units 152a, 152b and 153c according to allocation numbers, and also adds transmission power adjustment values from a transmission power adjustment value acquisition unit 151, thereby obtaining a transmission power setting value.

For example, when a center frequency is 1922.8 MHz, a band is 5 MHz, and the maximum number of actually used RBs is 25, the group division unit 156 divides the 25 RBs into a group of block numbers RB#0 to RB#8, a group of block numbers RB#9 to RB#16, and a group of block numbers RB#17 to RB#24.

Figures 15A, 15B:
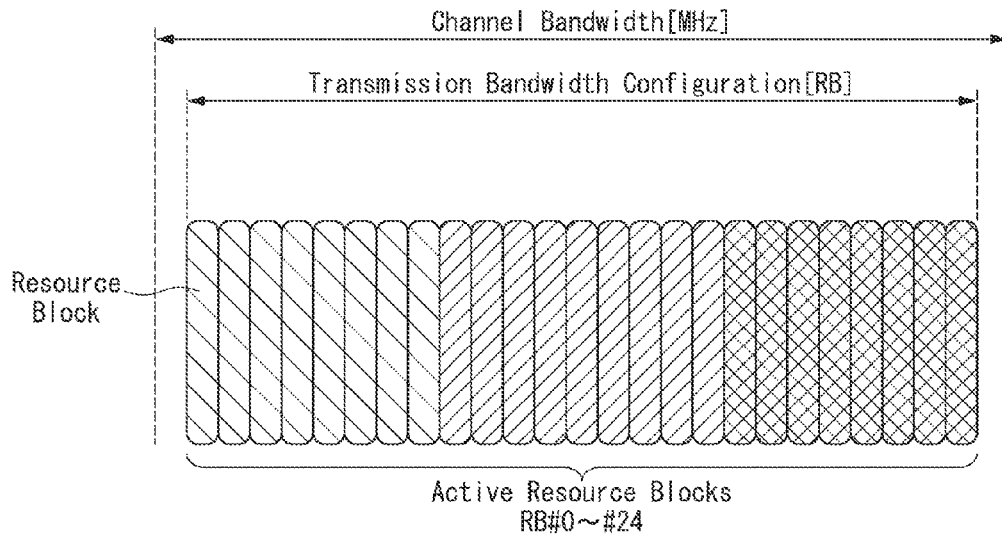
FIG. 15A is an explanatory diagram showing an example of division of resource blocks in the second embodiment of the present invention.
FIG. 15B is an explanatory diagram showing a transmission frequency and correction value table in the second embodiment of the present invention.

As shown in FIG. 15A and FIG. 15B, the transmission frequency correction value acquisition unit 152a applies correction table number #2 of the transmission frequency/correction value table 162 of FIG. 13 to the group of block numbers RB#0 to RB#8, and outputs a transmission power correction value of −90.

As shown in FIG. 15A and FIG. 15B, the transmission frequency correction value acquisition unit 152b applies correction table number #3 of the transmission frequency/correction value table 162 of FIG. 13 to the group of block numbers RB#9 to RB#16, and outputs a transmission power correction value of −60.

As shown in FIG. 15A and FIG. 15B, the transmission frequency correction value acquisition unit 152c applies correction table number #4 of the transmission frequency/correction value table 162 of FIG. 13 to the group of block numbers RB#17 to RB#24, and outputs a transmission power correction value of −50.

The contribution distribution adjustment value addition unit 155 regards about 832 (=900+(−90×9÷25−60×8÷25−50×8÷25)) obtained by adding −90, −60 and −50 that are correction values of the respective correction table numbers #2, #3 and #4 of the transmission frequency/correction value table 161 to 900 that is an adjustment value of +24 dBm according to RB allocation numbers (contribution ratios to transmission power) as a transmission power setting value.

As described above, in the second embodiment of the present invention, the group division unit 156 divides actually used RBs into some groups, and the contribution distribution adjustment value addition unit 155 corrects transmission power according to group-specific RB allocation numbers, such that the contribution distribution adjustment value addition unit 155 can calculate more appropriate transmission power.

Third Embodiment

Next, a third embodiment of the present invention will be described. In this embodiment, control of APC is performed by applying an APC correction table in accordance with a frequency of an allocated RB, thereby controlling transmission power. At this time, even if a center frequency is included in a used band, a plurality of correction values for which the APC correction table is referred to are applied.

More specifically, when a wireless communication terminal performs transmission, a transmission signal is fed back, a signal level of the transmission signal is detected and converted into a voltage in a detection IC, and the voltage value is subjected to A/D conversion and also averaged in a DSP. The obtained value and a transmission power setting value are compared, and when the obtained value is smaller than a value that should be original power, transmission power is increased. Meanwhile, when the obtained value is larger than the value that should be the original power, transmission power is reduced. This control of APC is performed to solve a problem of instability caused by the influence of an increase in temperature when transmission power of the power amplifier 24 (FIG. 2) that can be amplified to particularly high power is high. Here, control of APC may be performed as an adjustment of interpolating adjustments shown in the first and second embodiments using a transmission power/adjustment value table.

Figure 16:
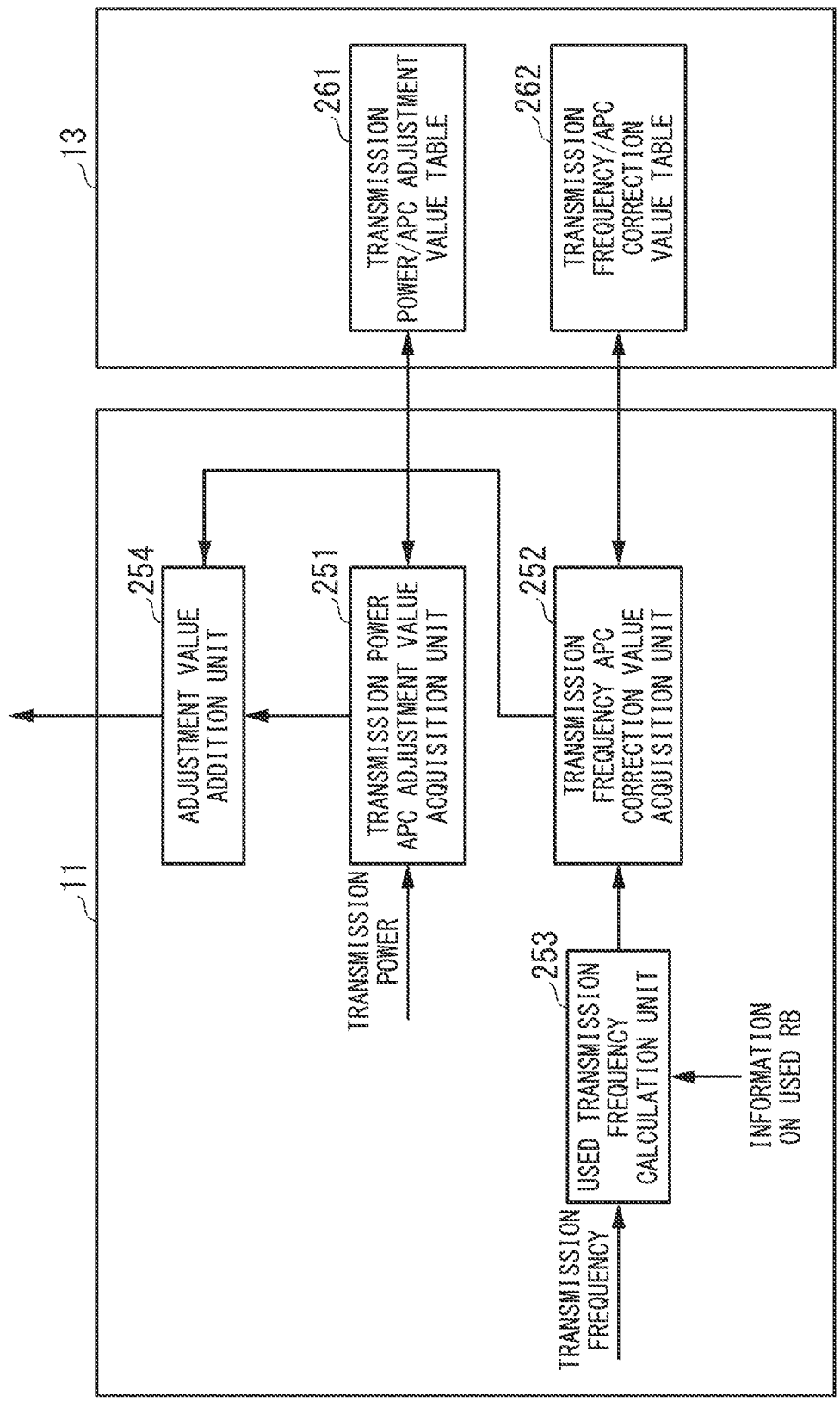
FIG. 16 is a block diagram of a functional part for describing an outline of power control in a third embodiment of the present invention.

FIG. 16 is a block diagram of a functional part for describing an outline of power control in this embodiment. While, in the first embodiment described above, the transmission power/adjustment value table 61 in which transmission power adjustment values for transmission power are written, and the transmission frequency/correction value table 62 in which transmission power correction values for transmission frequencies are written are used, in this third embodiment, a transmission power/APC adjustment value table 261 in which transmission power APC adjustment values for transmission power are written, and a transmission frequency/APC correction value table 262 in which transmission power APC correction values for transmission frequencies are written are used.

FIG. 17 is an explanatory diagram showing an example of the transmission power/APC adjustment value table 261. FIG. 17 shows an example of 1949.4 MHz, and in this example, an APC function unit is only used at 0 dBm or higher. This example shows that, when transmission power is +24 dBm, APC voltage input to the RFIC 27 is 1.3 V. Also, FIG. 18 is an example of the transmission frequency/APC correction value table 262.

In the first embodiment described above, the transmission power adjustment value acquisition unit 51 and the transmission frequency correction value acquisition unit 52 acquire a correction value, but in the third embodiment, a transmission power APC adjustment value acquisition unit 251 and a transmission frequency APC correction value acquisition unit 252 acquire a correction value with an APC voltage.

For example, when a center frequency is 1922.8 MHz, a band is 5 MHz, the number of RBs is 8, and positions of the RBs are block numbers #0 to #7 as shown in FIG. 9A and FIG. 9B, not the center frequency but a correction table in accordance with a center frequency of the positions of the actually used RBs is determined, and thus correction table number #2 of the transmission frequency/APC correction value table 262 of FIG. 18 is applied. In other words, transmission power is controlled such that 1.22 V (=1.30 V−0.08 V) obtained by adding −0.08 V of FIG. 18 to an APC value=1.30 V of +24 dBm of FIG. 17 can be obtained as an APC detection signal by the RFIC 27.

Likewise, when a center frequency is 1922.8 MHz, a band is 5 MHz, the number of RBs is 8, and positions of the RBs are block numbers #17 to #24 as shown in FIG. 11A and FIG. 11B, not the center frequency but a correction value table in accordance with a center frequency of the positions of the actually used RBs is determined, and thus correction table number #4 of the transmission frequency/APC correction value table of FIG. 18 is applied. In other words, transmission power is controlled such that 1.25 V (=1.30 V−0.05 V) obtained by adding −0.05 V of FIG. 18 to an APC value=1.30 V of +24 dBm of FIG. 17 can be obtained as an APC detection voltage by the RFIC 27.

Like in the second embodiment described above, in this embodiment, when allocated RBs include a center frequency of a transmission band, the RBs may be divided into a plurality of groups, correction values may be obtained according to the respective groups using a correction table, and these correction values may be added according to allocation numbers to obtain a transmission power setting value.

In other words, when there are 25 RBs, the RBs are divided into, for example, a group of block numbers RB#0 to RB#8, a group of block numbers RB#9 to RB#16, and a group of block numbers RB#17 to RB#24. By applying correction table number #2 of the transmission frequency/APC correction value table 262 to the group of block numbers RB#0 to RB#8, an APC voltage of −0.08 V is obtained. By applying correction table number #3 of the transmission frequency/APC correction value table 262 to the group of block numbers RB#9 to RB#16, an APC voltage of −0.06 V is obtained. By applying correction table number #4 of the transmission frequency/APC correction value table 262 to the group of block numbers RB#17 to RB#24, an APC voltage of −0.05 V is obtained. Transmission power is controlled such that about 1.23 V (=1.30 V+(−0.08×9÷25−0.06×8÷25−0.05×8÷25)) obtained by adding −0.08, −0.06 and −0.05 that are correction values of the respective correction table numbers #2, #3 and #4 of the transmission frequency/APC correction value table 262 to an APC value=1.30 V of +24 dBm according to RB allocation numbers (contribution ratios to transmission power) can be obtained as an APC detection signal by the RFIC 27.

As described above, the digital signal-processing device 11 can obtain appropriate transmission power in accordance with a characteristic of the RFIC 27 by performing control of APC.

Fourth Embodiment

Figure 19:
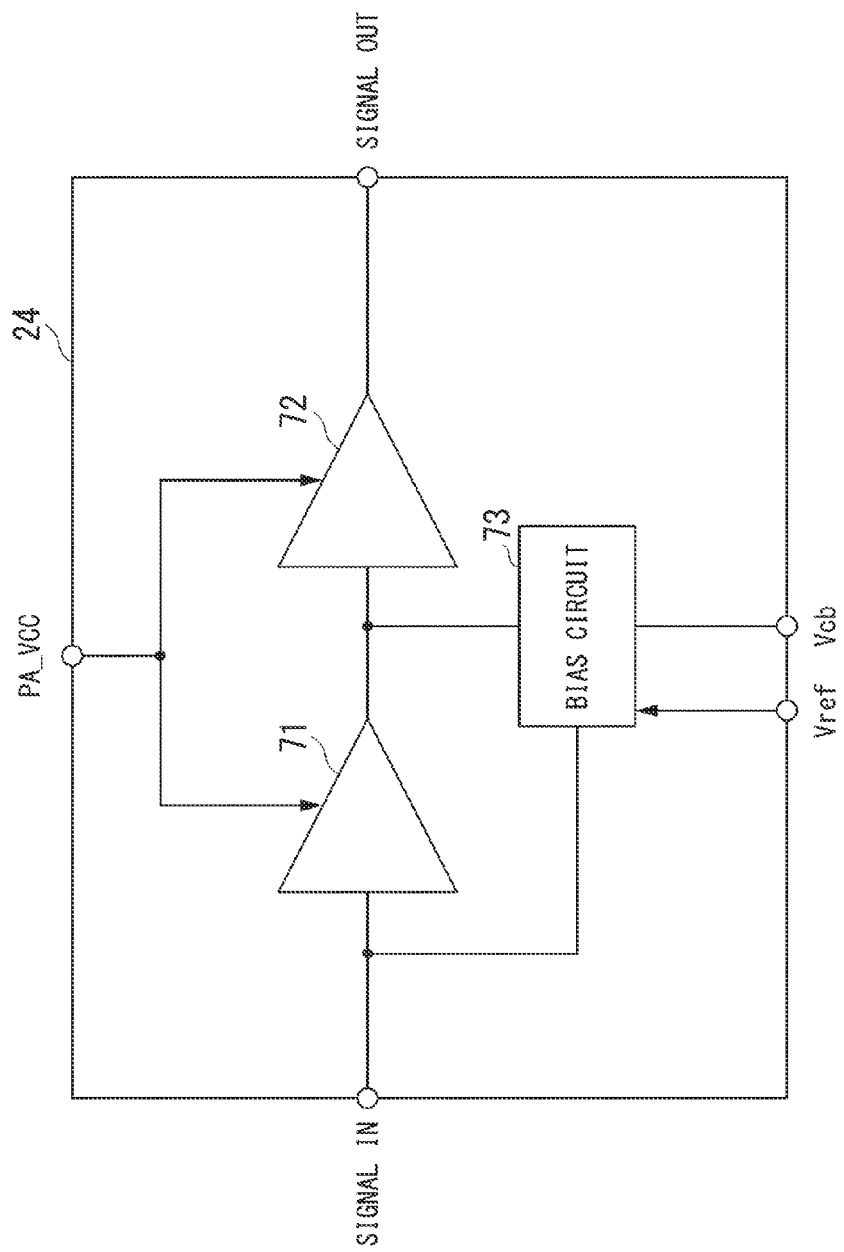
FIG. 19 is a block diagram of a power amplifier in a fourth embodiment of the present invention.

Next, a fourth embodiment of the present invention will be described. As shown in FIG. 2, power of a transmission signal is amplified by the power amplifier 24. When a power amplifier capable of high power amplification is required as the power amplifier 24, a power amplifier configured with an amplifier 71 and an amplifier 72 of a two-stage configuration, a supply power voltage PA_VCC to the amplifiers, a bias circuit 73 that supplies bias voltage of the amplifiers, a power supply voltage Vcb of the bias circuit 73, and a bias control voltage Vref that adjusts and controls an output bias voltage value as shown in FIG. 19 is generally used. In order to maintain the characteristic of linearity in the power amplifier, the power amplifier supply voltage PA_VCC needs to be corrected according to transmission power and a frequency.

In the fourth embodiment of the present invention, a supply voltage VCC of a power amplifier is corrected according to transmission power and a frequency. Even in this case, not based on a center frequency of a transmission band but based on a center frequency of positions of actually used RBs, a correction value of the power amplifier supply voltage is obtained.

Figure 20:
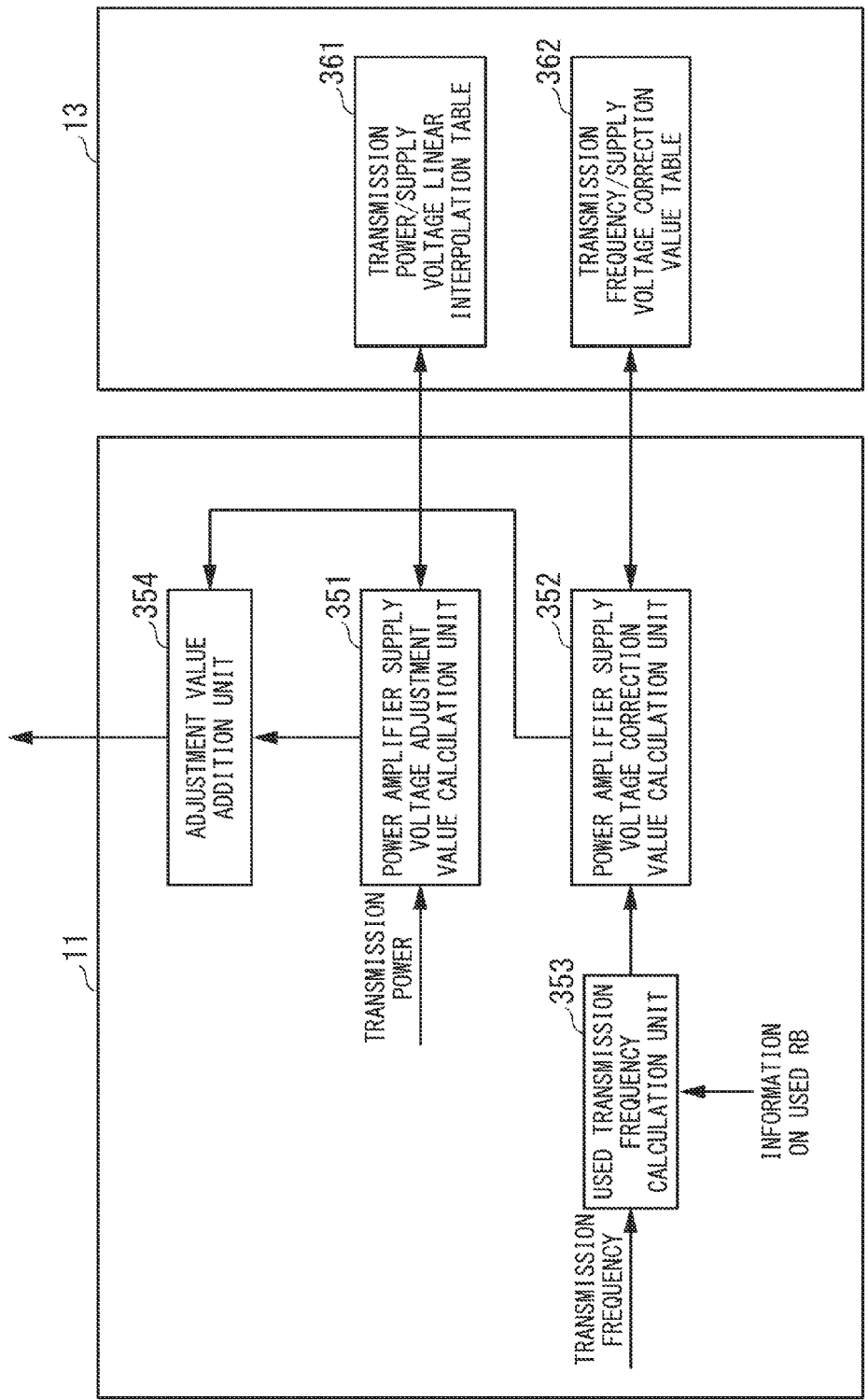
FIG. 20 is a block diagram of a functional part for describing an outline of power control in the fourth embodiment of the present invention.
Figure 23:
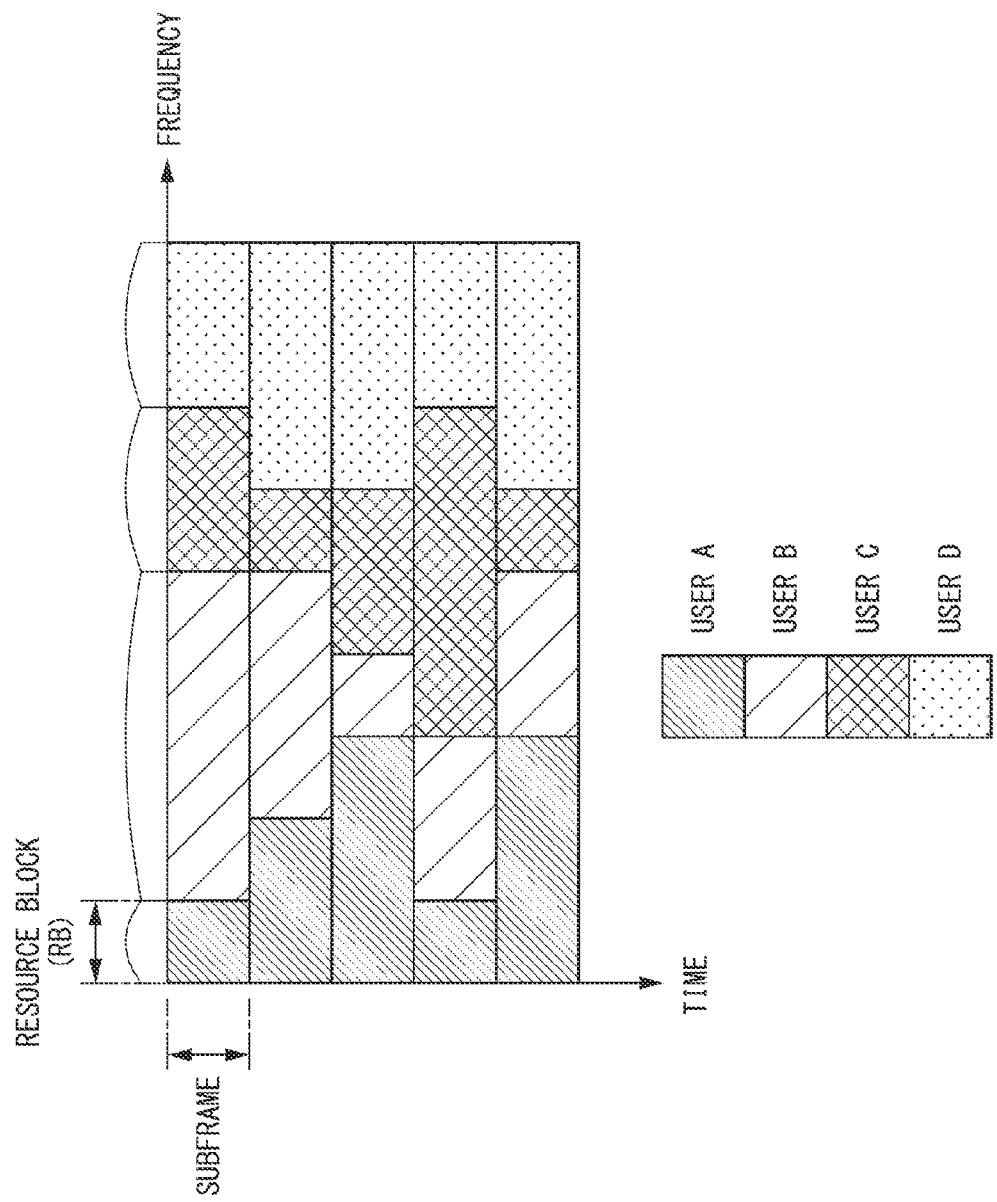
FIG. 23 is an explanatory diagram of communication using SC-OFDM in the related art.
Figure 24:
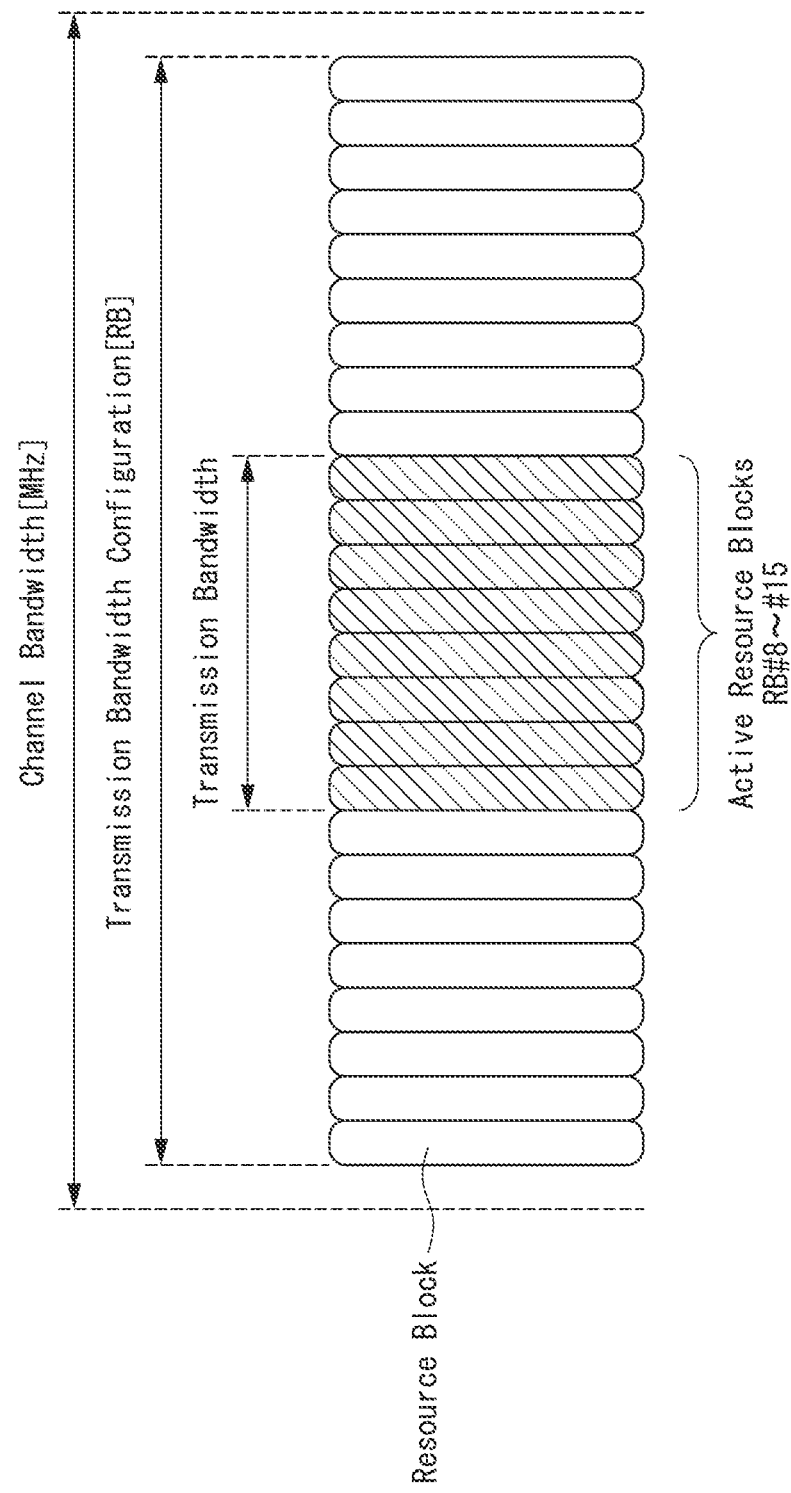
FIG. 24 is an explanatory diagram of resource blocks in the related art.
Figure 25:
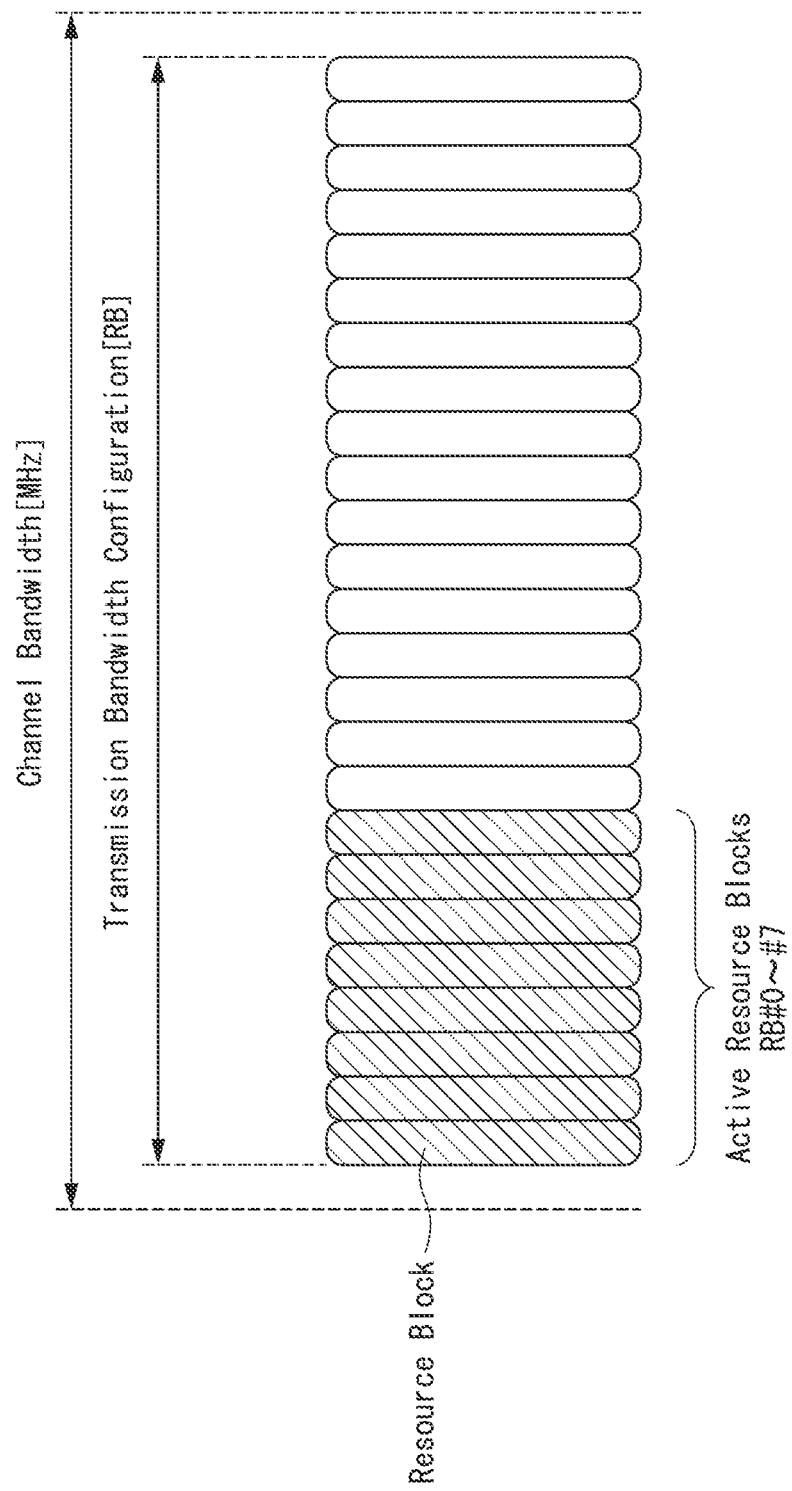
FIG. 25 is an explanatory diagram of resource blocks in the related art.
Figure 26:
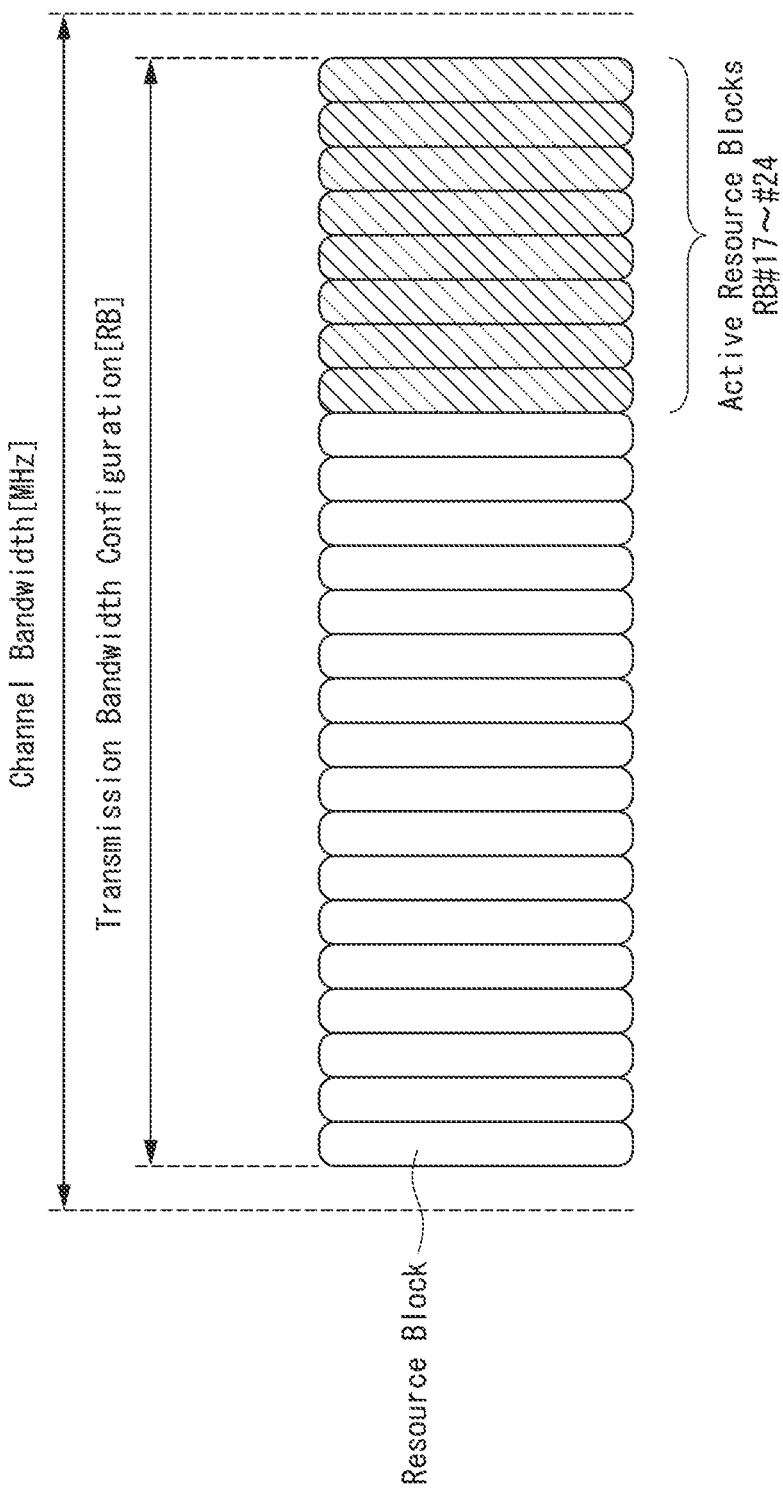
FIG. 26 is an explanatory diagram of resource blocks in the related art.
Figure 27:
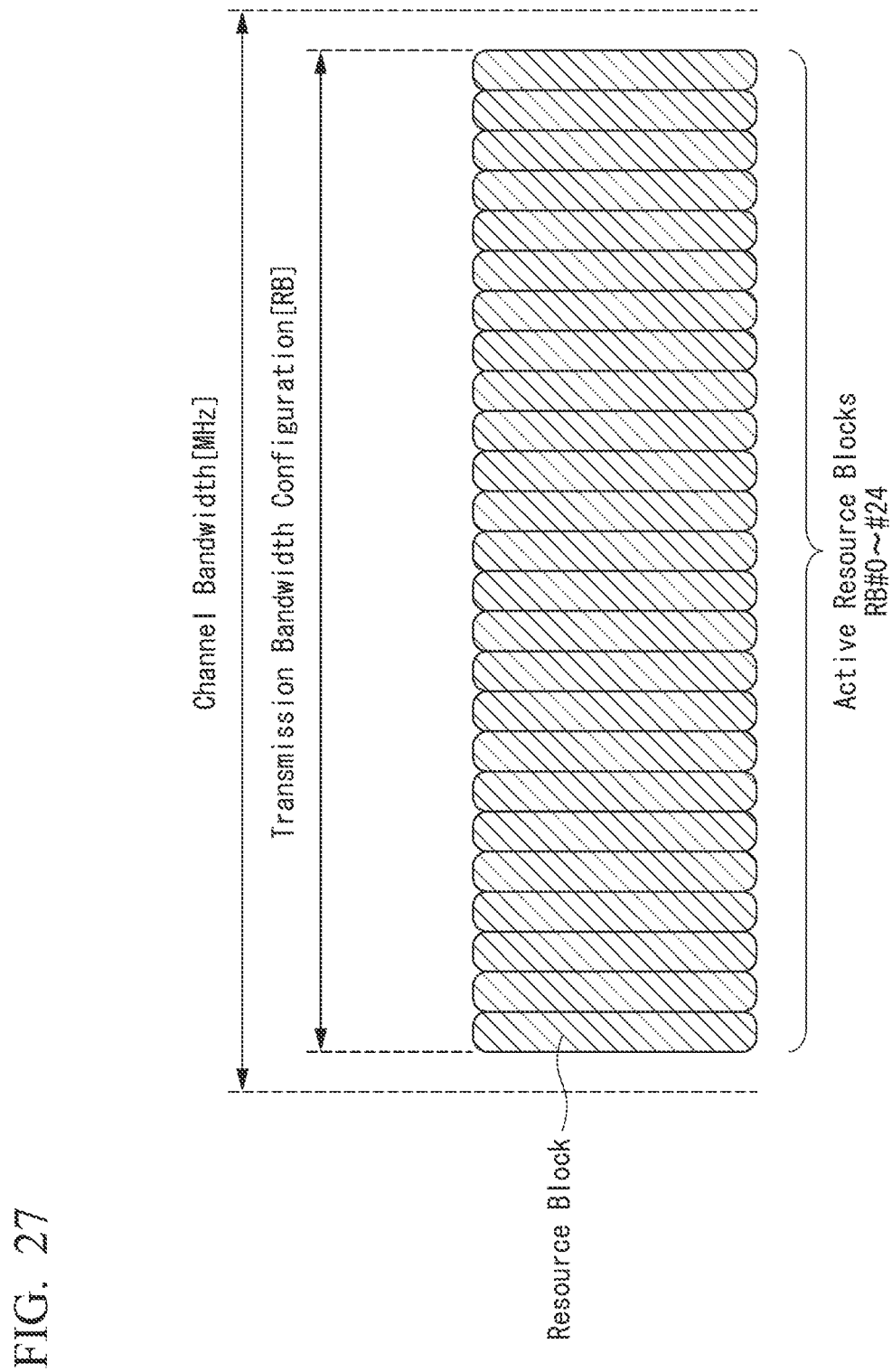
FIG. 27 is an explanatory diagram of resource blocks in the related art.

FIG. 20 shows the fourth embodiment of the present invention. In FIG. 20, a power amplifier supply voltage adjustment value calculation unit 351 outputs an adjustment value of a power amplifier supply voltage PA_VCC for transmission power with reference to a transmission power/supply voltage linear interpolation table 361.

A used transmission frequency calculation unit 353 calculates a center frequency of positions of actually used RBs from positions of transmission frequencies, band information on the transmission frequencies, and the position information on the used RBs.

A power amplifier supply voltage correction value calculation unit 352 outputs a correction value of the power amplifier supply voltage PA_VCC for the center frequency of the actually used transmission frequencies output from the used transmission frequency calculation unit 353 with reference to a transmission frequency/supply voltage correction value table 362.

An adjustment value addition unit 354 adds the adjustment value of the power amplifier supply voltage PA_VCC for transmission power obtained by the power amplifier supply voltage adjustment value calculation unit 351 and the correction value of the power amplifier supply voltage PA_VCC for the center frequency of the positions of the actually used RBs obtained by the power amplifier supply voltage correction value calculation unit 352, thereby calculating a setting voltage of the power amplifier supply voltage PA_VCC.

FIG. 21 is an example of the transmission power/supply voltage linear interpolation table 361, and FIG. 22 is an example of the transmission frequency/supply voltage correction value table 362.

In FIG. 21, a linear interpolation table shows a relationship between transmission power and the power amplifier supply voltage PA_VCC at a frequency of 1949.4 MHz at which an adjacent channel leakage ratio (ACLR) defined as the characteristic of linearity of a power amplifier in FIG. 6.6.2.3.2-1 of 6.6.2.3 of 3GPP TS36.101 becomes −38 dBc. In addition, due to a frequency, the power amplifier supply voltage PA_VCC necessary to ensure an ACLR of −38 dBc varies, and thus the power amplifier supply voltage PA_VCC necessary to ensure an ACLR of −38 dBc at respective frequencies is shown as correction values in FIG. 22.

For example, when a center frequency is 1922.8 MHz, a band is 5 MHz, the number of RBs is 8, and positions of the RBs are block numbers #0 to #7 as shown in FIG. 9A and FIG. 9B, not the center frequency but a correction value table in accordance with a center frequency of the positions of the actually used RBs is determined, and thus correction table number #2 of the transmission frequency/supply voltage correction value table 362 of FIG. 22 is applied. In other words, 3.20 V (=3.50 V−0.30 V) obtained by adding −0.3 V of FIG. 22 to a PA_VCC voltage=3.50 V of +24 dBm of FIG. 21 is supplied to the power amplifier 24 as the power amplifier supply voltage PA_VCC.

Likewise, when a center frequency is 1922.8 MHz, a band is 5 MHz, the number of RBs is 8, and positions of the RBs are block numbers #17 to #24 as shown in FIG. 11A and FIG. 11B, not the center frequency but a correction value table in accordance with a center frequency of the positions of the actually used RBs is determined, and thus correction table number #4 of the transmission frequency/supply voltage correction value table 362 of FIG. 22 is applied. In other words, 3.35 V (=3.50 V−0.15 V) obtained by adding −0.15 V of FIG. 22 to the PA_VCC voltage=3.50 V of +24 dBm of FIG. 21 is supplied to the power amplifier 24 as the power amplifier supply voltage PA_VCC.

Like in the second embodiment described above, when allocated RBs include a center frequency of a transmission band, the RBs may be divided into a plurality of groups, correction values may be obtained according to the respective groups using a correction table, and weights may be added to these correction values according to allocation numbers to obtain a supply voltage to the power amplifier 24.

In other words, when there are 25 RBs, the RBs are divided into, for example, a group of block numbers RB#0 to RB#8, a group of block numbers RB#9 to RB#16, and a group of block numbers RB#17 to RB#24. By applying correction table number #2 of the transmission frequency/supply voltage correction value table 362 to the group of block numbers RB#0 to RB#8, a PAV_CC voltage of −0.30 V is obtained. By applying correction table number #3 of the transmission frequency/supply voltage correction value table 362 to the group of block numbers RB#9 to RB#16, a correction value voltage of −0.20 V of PA_VCC is obtained. By applying correction table number #4 of the transmission frequency/supply voltage correction value table 362 to the group of block numbers RB#17 to RB#24, a correction value voltage of −0.15 V of PA_VCC is obtained. 3.28 V (=3.50 V+(−0.30×9÷25−0.20×8÷25−0.15×8÷25)) obtained by adding −0.30 V, −0.20 V and −0.15 V that are correction values of the respective correction table numbers #2, #3 and #4 of the transmission frequency/supply voltage correction value table 362 to a PA_VCC voltage=1.30 V of +24 dBm according to RB allocation numbers (contribution ratios to transmission power) is supplied to the power amplifier 24 as the power amplifier supply voltage PA_VCC.

In this embodiment, the supply voltage PA_VCC of a power amplifier is applied according to not a center frequency of transmission but a center frequency of positions of actually used RBs, a stabilized ACLR can be ensured, and also extra power consumption can be reduced.

A program for implementing a functional part of all or some of the CPU device 10, the digital signal-processing device 11, the RF device 12, and the memory device 13 is recorded in a computer-readable recording medium, and the program recorded in this recording medium is loaded into a computer system and executed, such that a process of each unit may be performed. The "computer system" mentioned herein includes an OS or hardware such as peripheral devices and the like.

When the WWW system is employed, the "computer system" also includes a home page providing environment (or display environment).

The "computer-readable recording medium" denotes a removable medium, such as a flexible disk, a magneto-optical disc, a ROM, a CD-ROM, or the like, or a storage medium, such as a hard disk built in a computer system or the like. Also, the "computer-readable recording medium" includes a medium that dynamically retains the program for a short time such as a communication line in the case of transmitting the program through a network, such as the Internet or the like, a telephone line, or the like, and a medium that retains the program for a fixed time such as a volatile memory in the computer system that becomes a server or a client in that case. The program may be a program for implementing a part of the functional part described above, or a program capable of implementing the functional part described above in combination with a program that has already been recorded in a computer system.

Thus far, embodiments of the present invention have been described in detail with reference to the drawings, but a detailed configuration is not limited to these embodiments and includes a change of design and the like within a range of the spirit of the invention.

Priority is claimed on Japanese Patent Application No. 2011-057620, filed Mar. 16, 2011, the content of which is incorporated herein by reference.

INDUSTRIAL APPLICABILITY

When communication is performed using an LTE terminal, it is possible to stabilize transmission power by reducing a difference between a transmission power setting value and actual transmission power.

DESCRIPTION OF REFERENCE SYMBOLS

11 Digital signal-processing device
10 CPU device
12 RF device
13 Memory device
14 Power supply device
15 Battery
16 Antenna
21 Antenna switch
22 Duplexer
23 Isolator
24 Power amplifier
25 Detection IC
26 LPF
27 RFIC
28 LNA
29 APC detection circuit
31 Square unit
32 Square unit
33 Error amplifier
41 DFT unit
42 Subcarrier mapping unit
43 IFFT unit
44 CP addition unit
51 Transmission power adjustment value acquisition unit
52 Transmission frequency correction value acquisition unit
53 Used transmission frequency calculation unit
54 Adjustment value addition unit
61 Transmission power/adjustment value table
62 Transmission frequency/correction value table

The invention claimed is:

1. A wireless transmission device which selectively allocates resource blocks divided in a frequency axis direction and a time axis direction to perform communication, comprising:
a transmission power adjustment value acquisition device which acquires a transmission power adjustment value corresponding to transmission power of the wireless transmission device;
a transmission frequency correction value acquisition device which acquires a correction value of the transmission power corresponding to a position of the resource block allocated to actual transmission; and
an adjustment value addition device which adds the transmission power adjustment value obtained by the transmission power adjustment value acquisition device and the correction value of the transmission power obtained by the transmission frequency correction value acquisition device, and outputs the sum as a transmission power setting value,
wherein the transmission frequency correction value acquisition device classifies the resource blocks into a plurality of groups, and acquires correction values of the transmission power for the respective groups, and
wherein the adjustment value addition device combines the group-specific correction values of the transmission power according to transmission power contribution ratios, and adds the combined value and the transmission power adjustment value.

2. The wireless transmission device according to claim 1, wherein,
the transmission power adjustment value acquisition device acquires the transmission power adjustment value corresponding to the transmission power as an APC adjustment value,
the transmission frequency correction value acquisition device acquires the correction value of the transmission power as an APC correction value, and
the adjustment value addition device adds the APC adjustment value obtained by the transmission power adjustment value acquisition device and the APC correction value obtained by the transmission frequency correction value acquisition device.

3. A wireless transmission device which selectively allocates resource blocks divided in a frequency axis direction and a time axis direction to perform communication, comprising:
a power amplifier supply voltage adjustment value calculation device which calculates an adjustment value of a supply voltage of a power amplifier corresponding to transmission power of the wireless transmission device;
a power amplifier supply voltage correction value calculation device which calculates a correction value of the supply voltage of the power amplifier corresponding to a position of the resource block allocated to actual transmission; and
a supply voltage adjustment value addition device which adds the adjustment value of the supply voltage of the power amplifier obtained by the power amplifier supply voltage adjustment value calculation device and the correction value of the supply voltage of the power amplifier obtained by the power amplifier supply voltage correction value calculation device, and outputs the sum as a transmission power setting value,
wherein the power amplifier supply voltage correction value calculation device classifies the resource blocks into a plurality of groups, and calculates correction values of the supply voltage for the respective groups, and
wherein the supply voltage adjustment value addition device combines the group-specific correction values of the supply voltage of the power amplifier according to transmission power contribution ratios, and adds the combined value and the adjustment value of the supply voltage of the power amplifier.

4. A power control method of a wireless transmission device which selectively allocates resources obtained by dividing a signal band in a frequency axis direction and a time axis direction to perform communication, comprising:
   acquiring a transmission power adjustment value corresponding to transmission power of the wireless transmission device;
   acquiring a correction value of the transmission power corresponding to a position of a resource block allocated to actual transmission; and
   adding the calculated transmission power adjustment value and the calculated correction value of the transmission power to control the transmission power,
   wherein the transmission frequency correction value acquisition device classifies the resource blocks into a plurality of groups, and acquires correction values of the transmission power for the respective groups, and
   wherein the adjustment value addition device combines the group-specific correction values of the transmission power according to transmission power contribution ratios, and adds the combined value and the transmission power adjustment value.

5. A power control method of a wireless transmission device which selectively allocates resource blocks divided in a frequency axis direction and a time axis direction to perform communication, comprising:
   calculating an adjustment value of a supply voltage of a power amplifier corresponding to transmission power of the wireless transmission device;
   calculating a correction value of the supply voltage of the power amplifier corresponding to a position of the resource block allocated to actual transmission; and
   adding the calculated adjustment value of the supply voltage of the power amplifier and the calculated correction value of the supply voltage of the power amplifier to supply the sum to the power amplifier as a transmission power setting value,
   wherein the power amplifier supply voltage correction value calculation device classifies the resource blocks into a plurality of groups, and calculates correction values of the supply voltage for the respective groups, and
   wherein the supply voltage adjustment value addition device combines the group-specific correction values of the supply voltage of the power amplifier according to transmission power contribution ratios, and adds the combined value and the adjustment value of the supply voltage of the power amplifier.

6. A non-transitory computer readable medium storing a computer-executable power control program for a wireless transmission device for selectively allocating resource blocks divided in a frequency axis direction and a time axis direction to perform communication, the program, upon execution by a processor of the wireless transmission device, causing the wireless transmission device to perform the steps of:
   acquiring a transmission power adjustment value corresponding to transmission power of the wireless transmission device;
   acquiring a correction value of the transmission power corresponding to a position of the resource block allocated to actual transmission; and
   adding the calculated transmission power adjustment value and the calculated correction value of the transmission power to control the transmission power,
   wherein the transmission frequency correction value acquisition device classifies the resource blocks into a plurality of groups, and acquires correction values of the transmission power for the respective groups, and
   wherein the adjustment value addition device combines the group-specific correction values of the transmission power according to transmission power contribution ratios, and adds the combined value and the transmission power adjustment value.

7. A non-transitory computer readable medium storing a computer-executable power control program for a wireless transmission device for selectively allocating resource blocks divided in a frequency axis direction and a time axis direction to perform communication, the program, upon execution by a processor of the wireless transmission device, causing the wireless transmission device to perform the steps of:
   calculating an adjustment value of a supply voltage of a power amplifier corresponding to transmission power of the wireless transmission device;
   calculating a correction value of the supply voltage of the power amplifier corresponding to a position of the resource block allocated to actual transmission; and
   adding the calculated adjustment value of the supply voltage of the power amplifier and the calculated correction value of the supply voltage of the power amplifier and supplying the sum to the power amplifier as a transmission power setting value,
   wherein the power amplifier supply voltage correction value calculation device classifies the resource blocks into a plurality of groups, and calculates correction values of the supply voltage for the respective groups, and
   wherein the supply voltage adjustment value addition device combines the group-specific correction values of the supply voltage of the power amplifier according to transmission power contribution ratios, and adds the combined value and the adjustment value of the supply voltage of the power amplifier.

* * * * *